(12) United States Patent
Wang et al.

(10) Patent No.: US 12,196,908 B2
(45) Date of Patent: Jan. 14, 2025

(54) THROUGH TUBING CEMENT EVALUATION BASED ON CASING EXTENSIONAL WAVES

(71) Applicant: Halliburton Energy Services, Inc., Houston, TX (US)

(72) Inventors: Ruijia Wang, Singapore (SG); Yao Ge, Singapore (SG); Brenno Caetano Troca Cabella, Rio de Janeiro (BR); Chung Chang, Houston, TX (US); Jing Jin, Singapore (SG); Ho Yin Ma, Singapore (SG); Xiang Wu, Singapore (SG)

(73) Assignee: Halliburton Energy Services, Inc., Houston, TX (US)

(*) Notice: Subject to any disclaimer, the term of this patent is extended or adjusted under 35 U.S.C. 154(b) by 219 days.

(21) Appl. No.: 17/645,193

(22) Filed: Dec. 20, 2021

(65) Prior Publication Data

US 2023/0194743 A1 Jun. 22, 2023

(51) Int. Cl.
*E21B 47/005* (2012.01)
*E21B 47/095* (2012.01)
(Continued)

(52) U.S. Cl.
CPC ............ *G01V 1/50* (2013.01); *E21B 47/005* (2020.05); *E21B 47/095* (2020.05); *G01B 17/06* (2013.01);
(Continued)

(58) Field of Classification Search
CPC ............ G01V 1/50; G01V 2210/1299; G01V 2210/1429; G01V 2210/324;
(Continued)

(56) References Cited

U.S. PATENT DOCUMENTS 3,583,677 A 6/1971 Phillips
3,914,603 A 10/1975 Paap et al.
(Continued)

FOREIGN PATENT DOCUMENTS

GB 2592974 9/2021
WO 2019018100 1/2019
(Continued)

OTHER PUBLICATIONS

"Great Britian Search Report for Application No. 2110237.1", Jan. 14, 2022, 3 pages.
(Continued)

*Primary Examiner* — Christopher J Sebesta
*Assistant Examiner* — Jennifer A Railey
(74) *Attorney, Agent, or Firm* — DeLizio, Peacock, Lewin & Guerra, LLP

(57) ABSTRACT

A method comprises conveying a downhole tool in a production tubing within a casing that is around a wall of a wellbore formed in a subsurface formation, wherein cement is placed in an annulus defined between the casing and the wall of the wellbore. The downhole tool includes at least one unipole receiver and at least one of a unipole and a monopole transmitter. The transmitter and receiver are mounted on a rotatable portion of the downhole tool. The method includes performing the following operations at at least two azimuthal positions, emitting an acoustic transmission outward toward the cement and detecting an acoustic response that is in response to the acoustic transmission propagating through the production tubing and the casing and into the cement. The acoustic response includes casing extensional waves, casing non-extensional waves, and tubing waves. The method includes evaluating the cement based on the casing extensional waves.

20 Claims, 13 Drawing Sheets

(51) Int. Cl.
    *G01B 17/06*     (2006.01)
    *G01V 1/50*     (2006.01)

(52) U.S. Cl.
    CPC ............. *G01V 2210/1299* (2013.01); *G01V 2210/1429* (2013.01); *G01V 2210/324* (2013.01); *G01V 2210/60* (2013.01)

(58) Field of Classification Search
    CPC .... G01V 2210/60; G01V 1/46; E21B 47/005; E21B 47/095; E21B 47/0025; E21B 2200/20; G01B 17/06
    See application file for complete search history.

(56) References Cited

U.S. PATENT DOCUMENTS

| | | | |
|---|---|---|---|
| 4,207,961 A | 6/1980 | Kitsunezaki | |
| 4,383,591 A | 5/1983 | Ogura | |
| 4,649,525 A | 3/1987 | Angona et al. | |
| 4,709,357 A | 11/1987 | Maki, Jr. | |
| 4,709,362 A | 11/1987 | Cole et al. | |
| 4,713,968 A | 12/1987 | Yale et al. | |
| 4,783,769 A | 11/1988 | Holzhausen | |
| 4,832,148 A | 5/1989 | Becker et al. | |
| 4,862,990 A | 9/1989 | Cole et al. | |
| 4,874,061 A | 10/1989 | Cole et al. | |
| 4,896,303 A | 1/1990 | Leslie et al. | |
| 4,951,267 A | 8/1990 | Chang et al. | |
| 5,010,527 A | 4/1991 | Mahrer | |
| 5,036,496 A | 7/1991 | Rutledge | |
| 5,036,945 A | 8/1991 | Hoyle et al. | |
| 5,080,189 A | 1/1992 | Cole et al. | |
| 5,135,072 A | 8/1992 | Meynier et al. | |
| 5,159,578 A | 10/1992 | Lenhardt et al. | |
| 5,166,909 A | 11/1992 | Cole et al. | |
| 5,168,470 A | 12/1992 | Dennis et al. | |
| 5,216,638 A | 6/1993 | Wright | |
| 5,266,845 A | 11/1993 | Sakaue | |
| 5,357,481 A | 10/1994 | Lester et al. | |
| 5,402,392 A | 3/1995 | Lu et al. | |
| 5,477,101 A | 12/1995 | Ounadjela | |
| 5,544,127 A | 8/1996 | Winkler | |
| 5,712,829 A | 1/1998 | Tang et al. | |
| 5,763,773 A | 6/1998 | Birchak et al. | |
| 5,852,262 A | 12/1998 | Gill et al. | |
| 5,859,811 A | 1/1999 | Miller et al. | |
| 5,881,310 A | 3/1999 | Airhart et al. | |
| 5,924,499 A | 7/1999 | Birchak et al. | |
| 6,041,861 A | 3/2000 | Mandal et al. | |
| 6,102,152 A | 8/2000 | Masino et al. | |
| 6,176,344 B1 | 1/2001 | Lester | |
| 6,188,961 B1 | 2/2001 | Mandal | |
| 6,464,439 B1 | 10/2002 | Janitzki | |
| 6,567,046 B2 | 5/2003 | Taylor et al. | |
| 6,772,067 B2 | 8/2004 | Blanch et al. | |
| 6,791,891 B1 | 9/2004 | Peng et al. | |
| 6,925,031 B2 | 8/2005 | Kriegshauser et al. | |
| 6,930,616 B2 | 8/2005 | Tang et al. | |
| 7,302,849 B2 | 12/2007 | Segal et al. | |
| 7,471,591 B2 | 12/2008 | Tello et al. | |
| 7,681,450 B2 | 3/2010 | Bolshakov et al. | |
| 8,270,248 B2 | 9/2012 | Hurst et al. | |
| 10,233,748 B2 | 3/2019 | Kortam et al. | |
| 10,253,615 B2 | 4/2019 | Hunter et al. | |
| 10,393,903 B2 | 8/2019 | Jin et al. | |
| 10,605,943 B2 | 3/2020 | Lemarenko et al. | |
| 10,705,056 B2 | 7/2020 | Lei et al. | |
| 10,858,933 B2 | 12/2020 | Bose et al. | |
| 11,131,182 B2 | 9/2021 | Liu et al. | |
| 2004/0119471 A1 | 6/2004 | Blanz et al. | |
| 2005/0226098 A1 | 10/2005 | Engels et al. | |
| 2006/0198243 A1* | 9/2006 | Tang | E21B 47/005 |
| | | | 367/35 |
| 2006/0233048 A1 | 10/2006 | Froelich et al. | |
| 2007/0019506 A1 | 1/2007 | Batakrishna et al. | |
| 2007/0140055 A1 | 6/2007 | Tello et al. | |
| 2007/0206439 A1 | 9/2007 | Barolak et al. | |
| 2008/0112262 A1 | 5/2008 | Tang et al. | |
| 2010/0250214 A1 | 9/2010 | Prioul et al. | |
| 2011/0019501 A1 | 1/2011 | Market | |
| 2011/0261647 A1 | 10/2011 | Tabarovsky et al. | |
| 2012/0176862 A1 | 7/2012 | D'Angelo et al. | |
| 2013/0021874 A1 | 1/2013 | Hartog et al. | |
| 2013/0070560 A1 | 3/2013 | Zheng | |
| 2013/0289881 A1 | 10/2013 | Sinha et al. | |
| 2014/0056111 A1 | 2/2014 | Vu et al. | |
| 2015/0107899 A1 | 4/2015 | Fisher, Jr. et al. | |
| 2015/0134257 A1 | 5/2015 | Erge et al. | |
| 2015/0198032 A1 | 7/2015 | Sinha | |
| 2015/0198732 A1 | 7/2015 | Zeroug et al. | |
| 2015/0218930 A1 | 8/2015 | Zeroug et al. | |
| 2015/0219780 A1 | 8/2015 | Zeroug et al. | |
| 2015/0338378 A1 | 11/2015 | Lu | |
| 2015/0378040 A1 | 12/2015 | Mandal | |
| 2016/0033664 A1 | 2/2016 | Cheng et al. | |
| 2016/0209539 A1 | 7/2016 | Le Calvez et al. | |
| 2017/0058660 A1 | 3/2017 | Hunter et al. | |
| 2017/0168179 A1 | 6/2017 | Lemarenko et al. | |
| 2017/0199295 A1 | 7/2017 | Mandal | |
| 2018/0031723 A1 | 2/2018 | Przebindowska et al. | |
| 2018/0149019 A1 | 5/2018 | Bose et al. | |
| 2018/0153205 A1 | 6/2018 | Wu | |
| 2018/0328163 A1* | 11/2018 | Hayman | E21B 47/005 |
| 2018/0334901 A1 | 11/2018 | Hou | |
| 2019/0018161 A1 | 1/2019 | Wang et al. | |
| 2019/0018162 A1 | 1/2019 | Wang et al. | |
| 2019/0025452 A1 | 1/2019 | Wang et al. | |
| 2019/0129053 A1 | 5/2019 | Wang et al. | |
| 2019/0145241 A1 | 5/2019 | Yao et al. | |
| 2019/0204468 A1 | 7/2019 | Ge et al. | |
| 2019/0211672 A1 | 7/2019 | Jin et al. | |
| 2019/0293823 A1 | 9/2019 | Sun et al. | |
| 2019/0376380 A1 | 12/2019 | Zhang et al. | |
| 2019/0383130 A1* | 12/2019 | Fox | G01V 1/40 |
| 2020/0003924 A1 | 1/2020 | Jin et al. | |
| 2020/0033494 A1 | 1/2020 | Patterson et al. | |
| 2020/0072036 A1 | 3/2020 | Wang | |
| 2020/0088901 A1* | 3/2020 | Quintero | E21B 47/005 |
| 2020/0116007 A1* | 4/2020 | Mandal | E21B 47/005 |
| 2020/0116883 A1 | 4/2020 | Padhi et al. | |
| 2020/0116884 A1 | 4/2020 | Weng et al. | |
| 2020/0199995 A1 | 6/2020 | Hu et al. | |
| 2020/0378247 A1 | 12/2020 | Ma et al. | |
| 2020/0400015 A1 | 12/2020 | Ge et al. | |
| 2021/0055436 A1 | 2/2021 | Wu et al. | |
| 2021/0102459 A1 | 4/2021 | Ewe et al. | |
| 2021/0103069 A1 | 4/2021 | Jin et al. | |
| 2021/0108510 A1 | 4/2021 | Ge et al. | |
| 2021/0109241 A1 | 4/2021 | Wang et al. | |
| 2021/0109243 A1 | 4/2021 | Ge et al. | |
| 2021/0123339 A1 | 4/2021 | Steel et al. | |
| 2021/0123731 A1 | 4/2021 | Chang et al. | |
| 2021/0141115 A1 | 5/2021 | Wang et al. | |
| 2021/0246777 A1 | 8/2021 | Zhao et al. | |
| 2021/0285324 A1* | 9/2021 | Sirevaag | E21B 47/14 |
| 2021/0396126 A1 | 12/2021 | Wang et al. | |
| 2021/0396900 A1 | 12/2021 | Wang et al. | |
| 2022/0381133 A1 | 12/2022 | Ge et al. | |
| 2023/0161063 A1 | 5/2023 | Geerits et al. | |
| 2023/0175386 A1 | 6/2023 | Ge | |
| 2023/0213677 A1 | 7/2023 | Ge et al. | |

FOREIGN PATENT DOCUMENTS

| | | |
|---|---|---|
| WO | 2019240952 | 12/2019 |
| WO | 2020222744 | 11/2020 |
| WO | 2023107136 | 6/2023 |
| WO | 2023129757 | 7/2023 |

OTHER PUBLICATIONS

"U.S. Appl. No. 17/643,259, Non-Final Office Action", Jun. 13, 2023, 7 pages.

(56) References Cited

OTHER PUBLICATIONS

Halliburton, "Wireline and Perforating Products and Services Catalog", 2013, 448 pages.
"PCT Application No. PCT/US2021/072826, International Search Report and Written Opinion", Aug. 24, 2022, 11 pages.
"PCT Application No. PCT/US2021/073046, International Search Report and Written Opinion", Sep. 7, 2022, 11 pages.
Wang, et al., "The Wavefield of Acoustic Logging in a Cased-hole With a Single Casing—Part I: a Monopole Tool", Geophysical Journal International, vol. 212, Oct. 12, 2017, 15 pages.
"PCT Application No. PCT/US2022/070022, International Search Report and Written Opinion", Sep. 21, 2022, 8 pages.
"U.S. Appl. No. 17/643,259, Non-Final Office Action", Sep. 11, 2023, 7 pages.
"Kuwait Application No. KWP2022000675 First Examination Report Mar. 5, 2024", Mar. 10, 2024, 9 pages.
"U.S. Appl. No. 17/643,259, Final Office Action", Dec. 28, 2023, 15 pages.
"U.S. Appl. No. 17/643,259 Non Final Office Action", Jun. 26, 2024, 17 pages.

\* cited by examiner

THROUGH TUBING CEMENT EVALUATION BASED ON CASING EXTENSIONAL WAVES

TECHNICAL FIELD

The disclosure generally relates to wellbores formed in subsurface formations, and in particular, evaluation of a bonding condition of a cement placed in such wellbores.

BACKGROUND

In some well logging applications (including production logging), a production tubing is needed in the wellbore for hydrocarbon recovery. A well logging tool is typically positioned in the production tubing that is located in a wellbore that includes a casing positioned around the wall of the wellbore. The area created between the casing and the wall of the wellbore is an annulus. Cement can be poured in the annulus to hold the casing in place and to prevent or reduce fluid migration between subsurface formations.

When pressure imbalance causes crossflow through poorly cemented sections of this cement, excessive production of unwanted fluids might occur. Thus, there is a need for cement logging through production tubing (known as through tubing cement evaluation (TTCE)) so that the production tubing is not required to be removed from the wellbore prior to the logging. Not requiring the removal of the production tubing prior to logging can save both time and money.

In addition to production logging, TTCE can also be useful for well abandonment operations. In particular, a well is completing its operating life cycle needs to be plugged and abandoned (P&A). A possible way to reduce the time and costs of P&A operations includes leaving the production tubing in the wellbore. However, an essential preparation task for P&A operations is to verify wellbore integrity (including condition of the cement behind the casing).

BRIEF DESCRIPTION OF THE DRAWINGS

Embodiments of the disclosure may be better understood by referencing the accompanying drawings.

DESCRIPTION OF EMBODIMENTS

Figure 1:
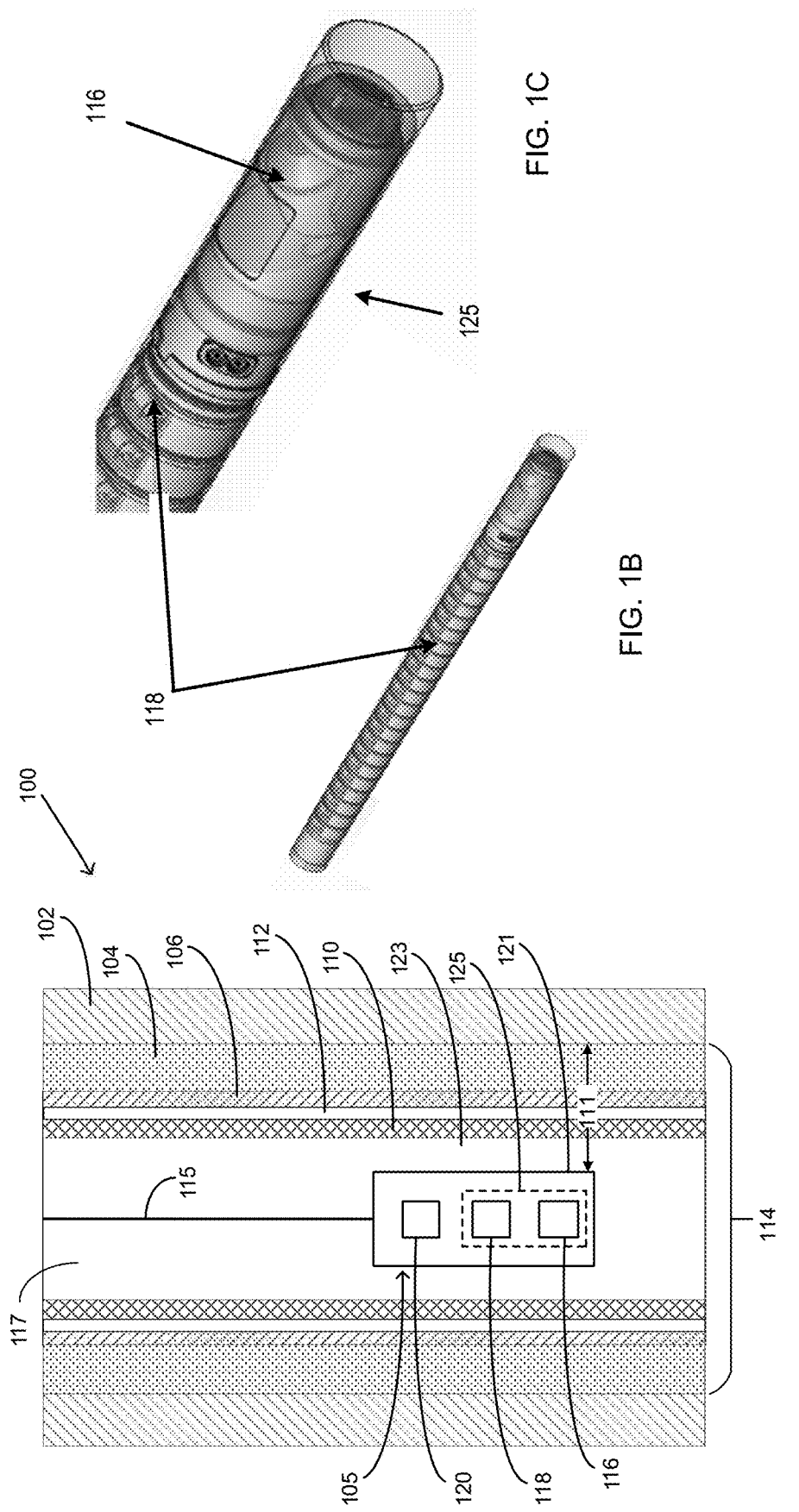
FIG. 1A depicts a side cross-sectional view of an example downhole tool having a transmitter and receiver for through tubing cement evaluation, according to some embodiments.
FIGS. 1B-1C depict perspective views of an example transmitter and receiver of the example downhole tool of FIG. 1A, according to some embodiments.

The description that follows includes example systems, methods, techniques, and program flows that embody embodiments of the disclosure. However, it is understood that this disclosure may be practiced without these specific details. For instance, this disclosure refers to through tube cement evaluation in illustrative examples. Embodiments of this disclosure can also be applied to evaluation of other material and other applications in a wellbore operation. As another example, this disclosure refers to evaluation of the cement bonding condition. Embodiments of this disclosure can also be applied to other material outside the casing, other properties of the cement or material, etc. In other instances, well-known instruction instances, protocols, structures and techniques have not been shown in detail in order not to obfuscate the description.

Example embodiments can be used for various downhole well logging applications, including through tubing cement evaluation (TTCE). For instance, example embodiments can a logging tool positioned in a production tubing within a casing of a wellbore for acoustic well logging. TTCE can be challenging because a signal emitted from a logging tool can have insufficient energy to penetrate beyond the tubing. The casing response can be too low relative to the overall signal, which makes evaluation of the cement behind the casing difficult.

Conventional approaches to TTCE include using a frequency spectrum of recorded signals, MIE resonance, and general borehole sonic dispersion response. Such approaches can provide a free-pipe indicator (that is used to reflect the position of free-pipe zones or the top of the cement). However, these approaches are limited to the use of the omnidirectional monopole transmitters. This results in a limited capability in detecting and locating azimuthal bonding information behind the casing.

In contrast, example embodiments can use directional transmitters and receivers with rotation capability for evaluating the materials behind the casing. As further described below, symmetrical mode (S0) waves in the casing (casing S0 waves or casing extensional waves) can have different excitation frequencies as compared to S0 waves in the production tubing (tubing S0 waves or tubing extensional waves). For instance, the casing S0 waves can have a lower excitation frequency than the tubing S0 waves because a diameter of the casing is larger than a diameter of the tubing. Accordingly, example embodiments can include signal processing that includes a passband for casing S0 waves and a stopband for tubing S0 waves to enhance the signal-to-noise ratio (SNR) of the casing S0 waves.

Additionally, in some implementations, to enable the function of azimuthal detection, S0 waves can be exited and detected by unipole transmitters and unipole receivers, respectively. For example, such transmitters and receivers can be mounted at a rotation portion of the logging tool. By rotating the transmitter and receivers, the casing S0 waves can be measured at different azimuths. Additionally, the bonding condition of the cement behind the casing can be further extracted from the amplitude and attenuation of the measured casing S0 waves (casing extensional waves). Accordingly, example embodiments can enable TTCE using low-frequency casing guided waves.

Thus, example embodiments can include excitation of low frequency signals that can pass through the casing and form casing S0 waves (casing extensional waves). Some embodiments can include an azimuthal filter to separate casing S0 waves and tubing S0 waves in the presence of eccentricity. Additionally, some embodiments can excite low-frequency S0 waves by unipole sources and receivers mounted on a rotation head.

Example TTCE Application

Some embodiments can be used in a downhole application to increase the measurement sensitivity of through tubing cement evaluation (TTCE) and acoustic signals at target points such as at or near a casing, a cement layer, and/or a casing/cement interface. However, example embodiments can be used in any other types of application. For example, example embodiments can be used in Measurement While Drilling and wireline operations, which are further described below. An example application for TTCE is now described. In particular, FIG. 1 depicts an example sensor configuration that is part of a through tubing cement evaluation (TTCE) system, according to some embodiments.

FIG. 1A depicts a side cross-sectional view of an example downhole tool having a transmitter and receiver for through tubing cement evaluation, according to some embodiments. FIGS. 1B-1C depict perspective views of an example transmitter and receiver of the example downhole tool of FIG. 1A, according to some embodiments.

As shown in FIGS. 1A-1C (collectively, FIG. 1), an acoustic logging tool 105 is deployed within a well that is defined by a wellbore 114 in which a production tubing 110 is installed within cement and metallic casing layers. The acoustic logging tool 105 is generally configured to induce acoustic echo responses and process the responses to determine material and structural properties of multiple material layers within the wellbore 114. For example, the echo responses may comprise reflected and/or refracted acoustic waves generated when acoustic signals transmitted from acoustic logging tool 105 reflect and/or refract at acoustic impedance boundaries within and between the wellbore layers.

The wellbore 114 is formed within a subsurface formation 102, such as may comprise a hydrocarbon formation in part, by drilling, and is typically filled with liquid and/or slurry substances such as water, reservoir fluids, etc. The outer perimeter of the wellbore 114 can be sealed from the subsurface formation 102 by one or more barrier layers. For instance, a casing 106 comprises a metallic tubular member forming an inner liner that seals the interior of the wellbore 114. To securely position the casing 106 with respect to the inner surface of the subsurface formation 102, a cement layer 104 is formed between the casing 106 and the inner surface of the subsurface formation 102 that bounds the wellbore 114. The production tubing 110 is installed within the cylindrical interior space of the casing 106 to form an innermost production conduit 117 and an annular space 112 that typically forms an annular fluid layer between the outer surface of the production tubing 110 and the inner surface of casing 106.

The acoustic logging tool 105 includes a tool housing 121 within which an acoustic sensor 125 and a controller 120 can be disposed. As shown in FIG. 1A, the acoustic sensor 125 comprises an acoustic transmitter 116 and an acoustic receiver 118 within the tool housing 121 within which the controller 120 is also disposed. As further described below, the acoustic transmitter 116 can include one or more transmitters. Similarly, the acoustic receiver 118 can include one or more receivers.

The acoustic logging tool 105 is positioned within the innermost production conduit 117 in the production tubing 110 with an additional annular fluid layer 123 formed in the annular space between the outer surface of the tool housing 121 and the inner surface of the production tubing 110. The acoustic sensor components are movably disposed within the fluid and along the length of the production conduit 117 via a conveyance means 115 such as a wireline or slickline. In some embodiments, the acoustic sensor 125 may be configured with the acoustic transmitter 116 and the acoustic receiver 118 being individually contained and independently movable components. Alternatively, the acoustic sensor 125 may be configured within a contiguous sensor housing such as depicted in FIG. 1 in which both the transmitter 116 and the receiver 118 are contained in a common tool housing 121.

The acoustic logging tool 105 comprises acoustic source/transmission components and acoustic detection and processing components within the acoustic sensor 125. The transmitter and receiver components of the acoustic sensor 125 are configured to measure acoustic responses, such as in the form of acoustic echoes, generated from acoustic source signals transmitted from the acoustic transmitter 116 to various acoustic response target points within the wellbore 114. In the depicted embodiment of FIG. 1B-1C, the acoustic sensor 125 comprises the transmitter 116 and the receiver 118. In this example, the transmitter 116 includes one or more cylindrical piezoelectric ceramics. Additionally, as shown, the receiver 118 includes one or more cylindrical piezoelectric ceramics. The transmitter 116 and the receiver 118 are configured as piezoelectric transducers that are electrically, optically, or otherwise communicatively coupled to the controller 120. In some implementations, the transmitter 116 may be a unipole by a tilted piezoelectric transducer with a cover; while in other implementations, the transmitter 116 may be a monopole. Both unipole and monopole can generate extensional wave signals in the casing.

The controller 120 may be a programmable electronic module that is communicatively coupled to the piezoelectric transducer(s) of the transmitter/receiver components within the acoustic sensor 125. The controller 120 is configured, using electronics and program code instructions, to provide excitation pulse signals to the transmitter 116 during pulse transmit periods that may comprise the excitation phase of measurement cycles. The controller 120 can include a signal generator and a signal processor. The signal generator is configured using any combination of hardware and/or program code constructs to generate and send excitation signals via the transmitter 116. The signal processor is configured using any combination of hardware and/or program code constructs to detect/measure echo response signals received from the receiver 118.

Sensor pulses, such as the sensor pulse 138, can be generated periodically, intermittently, or otherwise as part of individual measurement cycles. Each measurement cycle can begin with an excitation phase during which the signal generator can apply an electrical excitation that induces corresponding acoustic pulses in the transmitter transducer(s) to which the excitation is applied. Each measurement cycle can further include an echo response phase such as may be defined and implemented by the signal processor components. During the echo response phase of each measurement cycle, signal processor components can detect and process acoustic echo response signals such as the signal 140.

TTCE analysis can include acoustic response information that is location-specific (e.g., along the cylindrical boundary between the cement layer 104 and the casing 106) as well as properties specific (e.g., density, structural characteristics). The multiple different material layers that may present acoustic barriers (reflectors and sinks) and varying ambient environmental conditions may present interference for or otherwise reduce accuracy of the acoustic measurements and particularly acoustic measurements for which the target response locations are outside of one or more of the wellbore tubulars such as the production tubing 110 and the casing 106. The apparatus 100 is configured to collect and process acoustic response information in a manner that removes interference such as extraneous acoustic response information and sensor variations to enable more accurate representation of target acoustic response information. The acoustic measurement components of the apparatus 100 are configured to implement efficient and accurate acoustic measurements of wellbore material properties with reduced reliance on removing internal acoustic barriers such as production tubing.

In some embodiments, the apparatus 100 is configured to collect acoustic measurement information that uses differential processing of acoustic responses to more precisely isolate intended acoustic response information such as cement bond response information. As further described below, the acoustic transmitter 116 can include an azimuthally directional transmitter such as a unipole transmitter that emits substantially unidirectional acoustic pulses. In some other embodiments, the acoustic transmitter 116 can be other types of transmitters (such as a dipole transmitter). Also, as further described below, the acoustic receiver 118 can be a multi-receiver array. For example, the acoustic receiver 118 can be an array of two or more azimuthal receivers.

The target points for acoustic measurements by the directional acoustic transmitter/receiver pair may be included along one or more circumferential boundaries at various radial distances from the center of the wellbore 114. For example, as further described below, target points can include cement-to-casing bond target points that are located outside of both the production tubing 110 and the casing 106.

Figure 2:
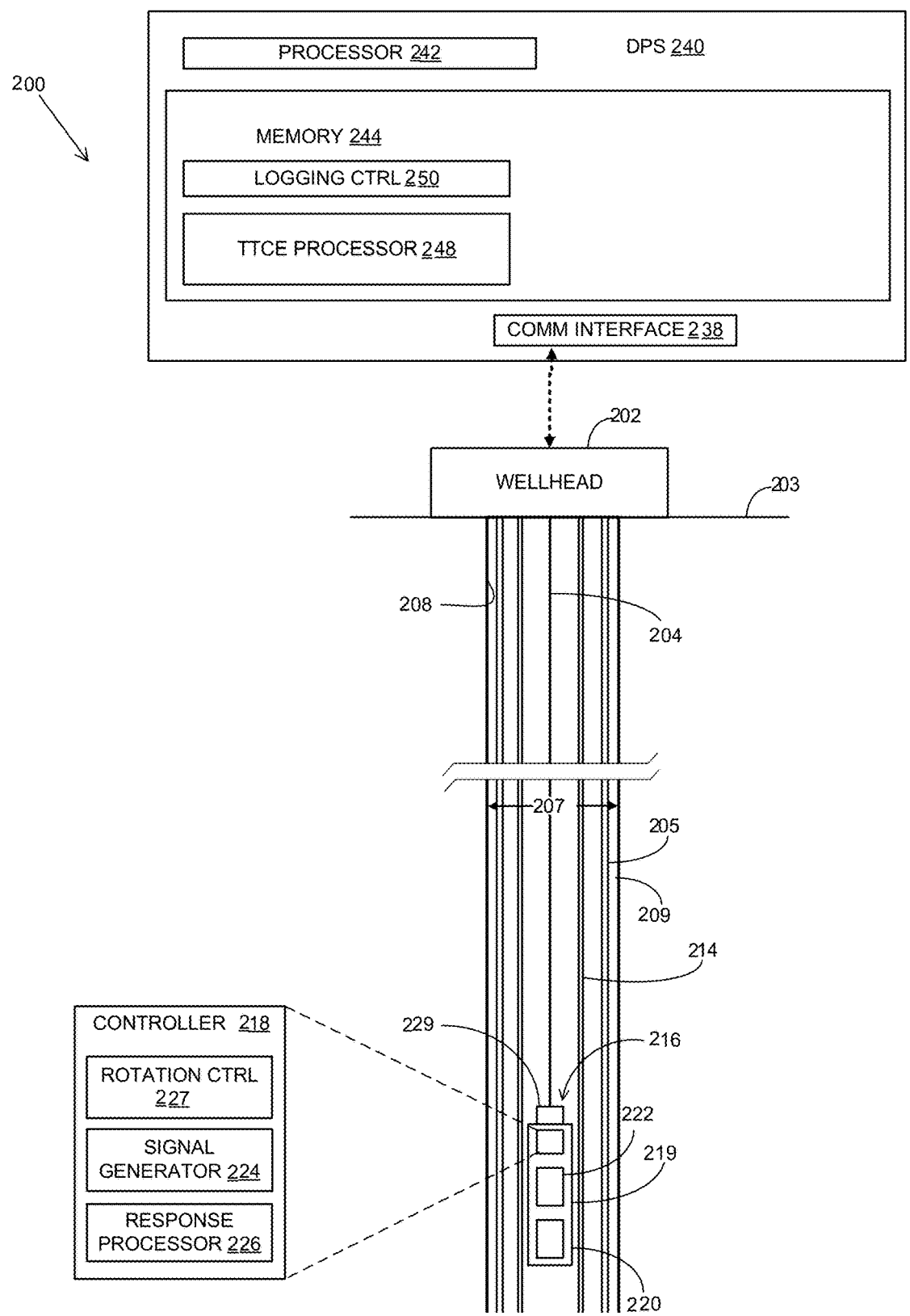
FIG. 2 depicts an example system that is configured to implement through tubing cement evaluation (TTCE), according to some embodiments.

FIG. 2 depicts an example system that is configured to implement through tubing cement evaluation (TTCE), according to some embodiments. In FIG. 2, a well system 200 is particularly configured to address issues posed by TTCE, which entails measuring acoustic responses, such as acoustic echoes, generated by acoustic source signals that originate within an innermost tubing within a wellbore. The well system 200 includes subsystems, devices, and components configured to implement acoustic measurement testing procedures within a substantially cylindrical wellbore volume 207 that in the depicted embodiment is bounded and sealed by a casing 205. A cement layer 209 between the casing 205 and an inner borehole wall 208 provides a protective seal that maintains structural and positional stability of the casing 205. The well system 200 includes a wellhead 202 configured to deploy drilling and production and/or injection equipment such as drilling strings, production strings, etc. As shown, an interior tubing 214 is deployed within the wellbore volume 207 and may comprise production tubing, drilling tubing such as drill pipes, injection tubing, or other type of tubing.

The wellhead 202 includes components for configuring and controlling deployment in terms of insertion and withdrawal of a test string within the wellbore volume 207. The test string may be configured as a wireline test string deployed within the interior tubing 214 and having a wireline cable 204 for moving and providing communication and power source connectivity for downhole test tools. In the depicted embodiment, the wireline cable 204 is configured as the conveyance means for a logging tool 216 that includes an acoustic transmitter 220 and an acoustic receiver 222 disposed within a tool housing 219. Communication and power source couplings are provided to the acoustic transmitter 220 and the acoustic receiver 222 via the wireline cable 204 having one or more communication and power terminals within the wellhead 202.

The acoustic transmitter 220 and the acoustic receiver 222 comprise components, including components not expressly depicted, configured to implement acoustic measurement testing including TTCE testing. The acoustic transmitter 220 may be configured as an acoustic transducer as depicted in FIG. 1B that transmits acoustic pulses in an azimuthally directional manner.

The acoustic receiver 222 may comprise an array of azimuthal receivers with two or more receivers. The logging tool 216 further includes a controller 218 comprising components including a signal generator 224 and a response processor 226 for controlling acoustic measurement operation. The signal generator 224 is configured to generate electrical signals that are converted by the acoustic transmitter 220 into acoustic waves emitted within the wellbore 207. The response processor 226 is configured to measure acoustic responses by processing the converted acoustic wave information from the acoustic receiver 222.

The logging tool 216 is coupled via a telemetry link within the wireline cable 204 to a data processing system (DPS) 240. The DPS 240 includes a communication interface 238 configured to transmit and receive signals to and from the logging tool 216 as well as other devices within well system 200 using a communication channel with the wireline cable 204 as well as other telemetry links such as wireless electromagnetic links, acoustic links, etc. The DPS 240 may be implemented in any of one or more of a variety of standalone or networked computer processing environments. As shown, the DPS 240 may operate above a terrain surface 203 within or proximate to the wellhead 202, for example. The DPS 240 includes processing, memory, and storage components configured to receive and process acoustic measurement information to determine material and structural properties and conditions within and/or external to the cylindrical volume defined by the borehole wall 208. The DPS 240 is configured to receive acoustic response data from the logging tool 216 as well as from other sources such as surface test facilities. The acoustic data received from the logging tool 216 includes echo response signals detected by the acoustic receiver 222. The DPS 240 comprises, in part, a computer processor 242 and a memory device 244 configured to execute program instructions for controlling measurement cycles and processing the resultant echo response signals to determine wellbore material properties. Such properties and structural attributes may include but are not limited to cement structural integrity and the state of adhesion of the bonding between the cement layer 209 and the casing 205.

The DPS 240 includes program components including a TTCE processor 248 and a logging controller 250. The TTCE processor 248 includes program components and data configured to process acoustic response data received from the logging tool 216. The logging controller 250 includes program components and data configured to coordinate and otherwise control positioning and repositioning of the logging tool 216 within and along the length of the interior tubing 214, as well as the acoustic measurement procedures at each position. Loaded from the memory 244, the TTCE processor 248 is configured to execute program instructions to receive and process acoustic response data such as the logging data 230.

The components within the DPS 240 and the test string interoperate to implement acoustic measurement collection and processing in a manner enabling optimal accuracy of through tubing material evaluation. A next acoustic measurement cycle may begin with positioning of the logging tool 216 at a next axial location along the length of interior tubing 214. At the next axial location, the logging tool 216 can rotationally positioned to an initial specified azimuthal angle. In the depicted embodiment, the logging tool 216 may be rotated via controlled actuation of a DC motor 229. For example, a rotation controller 227 may be incorporated within the controller 218 and be configured to azimuthally position the logging tool 216, and more specifically the transmitter/receiver within the logging tool 216, to a specified initial measurement azimuth angle.

The measurement cycle may continue with the logging tool 216 measuring an acoustic response at the initial azimuthal angle. For TTCE logging, the overall acoustic response includes an echo response window in which echo signal characteristics profile material and structural characteristics of the cement-to-casing bonding at the azimuth angle. Following the initial azimuth measurement, the logging tool 216 is rotated to a next azimuth at which a next azimuthally specific acoustic response is measured and otherwise collected, and the process is repeated at other azimuthal angles along a full 360° azimuthal path. The azimuthal angles at which the measurements are performed are selected to result in measurement pairs that are substantially azimuthally offset (e.g., one measurement is separated by at least 90° from the other measurement in the pair). In some embodiments, the measurement angles are selected to result in measurement pairs that are substantially azimuthally opposed (e.g., separated by approximately 180° within a range of) 10°. It should be noted that the measurements at each point may be nearly instantaneous due to the proximity of the cement layer target points such that the rotation of the logging tool 216 between measurements may be intermittent or continuous.

Example Transmitter-Receiver Configuration

Figure 3:
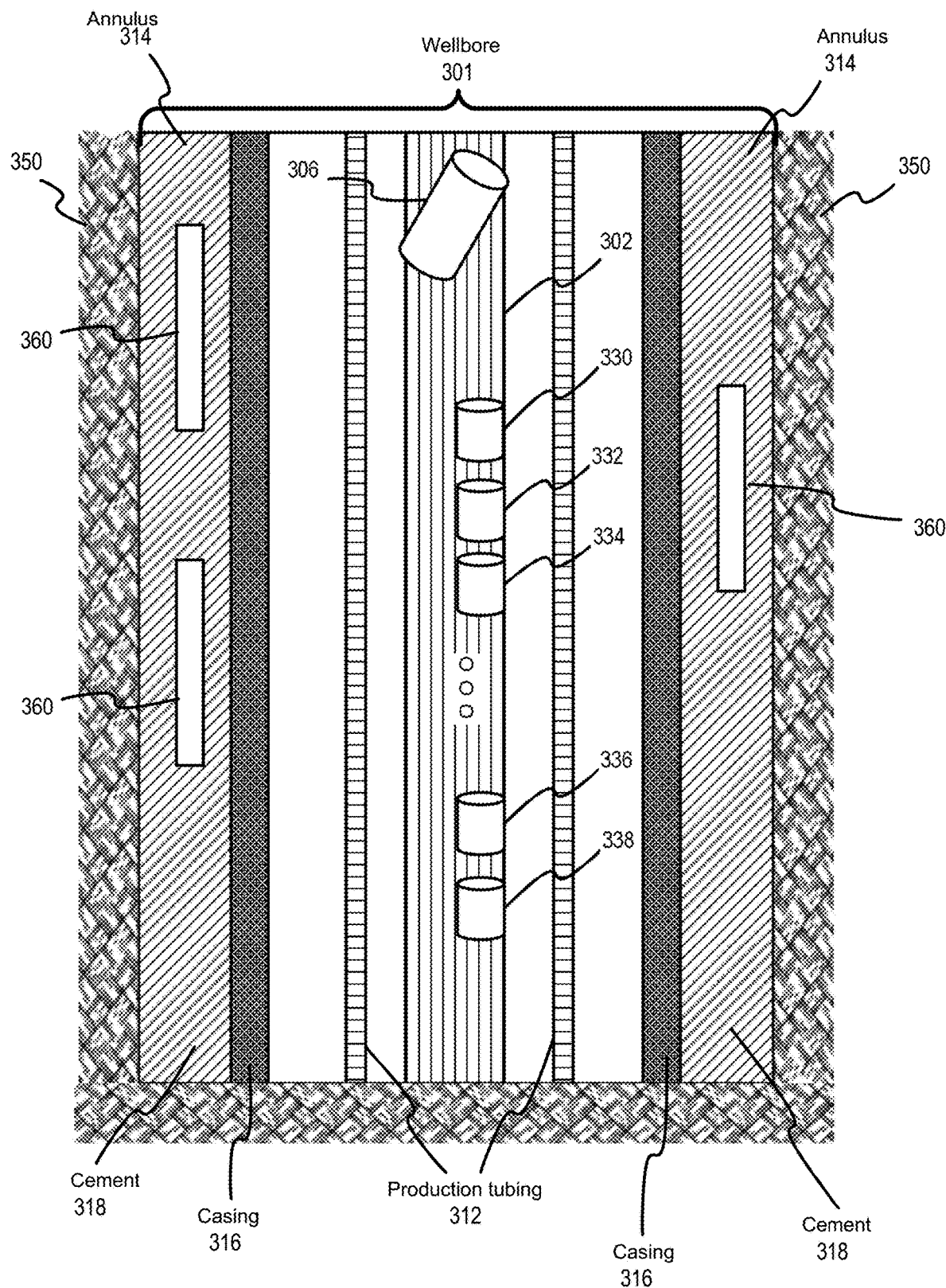
FIG. 3 depicts an example transmitter-receiver configuration for performing TTCE, according to some embodiments.

Example transmitter-receiver configurations are now described. FIG. 3 depicts an example transmitter-receiver configuration for performing TTCE, according to some embodiments. FIG. 3 depicts a wellbore 301 formed in a subsurface formation 350. The wellbore 301 has been cased (with a casing 316) such that an annulus 314 has been defined between a wall of the wellbore 301 and the casing 316. Cement 318 has been poured into the annulus 314. In this example, the cement 318 includes three channels 360. Thus, these portions of the cement 318 are partially (not fully) bonded. As further described below, example embodiments can evaluate the cement to determine varying bonding conditions of the cement.

A production tubing 312 has been positioned down the wellbore 301 within the casing 316. A downhole tool 302 is positioned within the production tubing 312. In this example, the downhole tool 302 includes a transmitter 306 in a tilted position and receivers 330-338 placed in different longitudinal positions along the downhole tool 302. Example operations of the transmitter 306 and the receivers 330-338 for performing TTCE are now described.

Lamb waves propagating in the casing can be used to evaluate cement bonding conditions of the cement behind the casing. Lamb waves can exhibit velocity dispersion. That is, the velocity of propagation of the lamb waves can depend on the frequency (or wavelength) and the elastic constants and density of the material. This phenomenon can be used to evaluate wave behavior in plates or a pipe. For the lamb wave propagating in a cylindrical pipe, the dispersions of the lamb waves can be dependent on the pipe's thickness and diameter.

In some embodiments, the symmetric and antisymmetric zero-order modes of these waves can be used. These modes have "nascent frequencies" of essentially zero. Thus, these modes can be the only modes that can exist over the entire frequency spectrum from zero to indefinitely high frequencies. In the low-frequency range, the wavelength can be greater than the pipe thickness. In this low-frequency range, the symmetric zero-order mode and the antisymmetric zero-order mode can also be defined as the "extensional mode" and the "flexural mode" respectively. Such terms can describe the nature of the motion and the elastic stiffnesses that govern the velocities of propagation.

The elliptical particle motion can be mainly in the plane of the pipe for the symmetrical, extensional mode. Conversely, the elliptical particle motion can be perpendicular to the plane of the pipe for the antisymmetric, flexural mode. However, these characteristics can change at higher frequencies. Additionally, these two modes can be used in cement bond logging because these modes can (a) exist at all frequencies and (b) (in most practical situations) can carry more energy than the higher-order modes.

In some embodiments, the zero-order symmetric mode (designated S0) can travel at the "casing velocity" in the low-frequency regime, where it is properly called the "extensional mode". In this low-frequency regime, the plate/pipe can stretch in the direction of propagation and contracts correspondingly in the thickness direction. Especially for a plate, as the frequency increases and the wavelength becomes comparable with the plate thickness, curving of the plate starts to significantly influence its effective stiffness. Additionally, the phase velocity can drop smoothly while the group velocity drops somewhat precipitously towards a minimum. However, at higher frequencies, both the phase velocity and the group velocity can converge towards the Rayleigh wave velocity (the phase velocity from above, and the group velocity from below).

Figure 4:
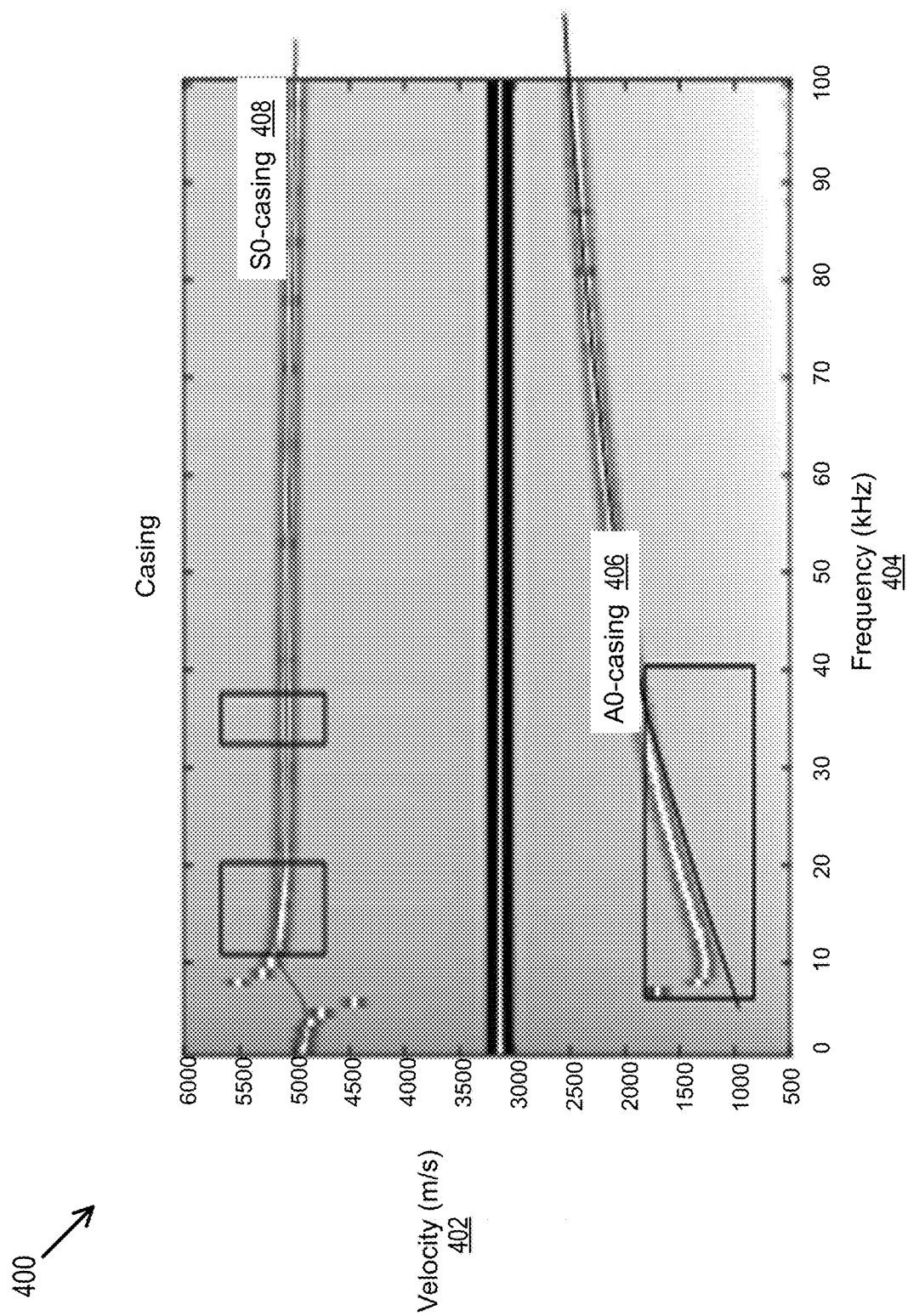
FIG. 4 depicts a graph of example S0 and A0 dispersions, according to some embodiments.

Additionally, the zero-order symmetrical mode (designated S0) and the zero-order antisymmetric mode (designated A0) in a casing or tubing pipe can be slightly different from these waves in a plate. To illustrate, FIG. 4 depicts a graph of example S0 and A0 dispersions in a free pipe without any fluid inside or outside the pipe, according to some embodiments. A graph 400 of FIG. 4 includes a y-axis 402 that is a velocity (meters/second) (m/s) of a wave and an x-axis 404 that is a frequency (kilohertz (kHz)) of the wave.

The graph 400 includes a curve 408 that is S0 casing waves and a curve 406 that is the A0 casing waves.

As shown, the S0 casing waves and A0 casing waves interfere with each other at low frequencies. Also, the A0 dispersion can approach and take the position of the S0 dispersion at low frequencies. However, at high frequencies, S0 casing waves have a cutoff-frequency at the frequency when A0 casing waves take the position of S0 casing waves. This phenomenon can be a result of the curvature of the pipe, and the cutoff frequency can be related to the diameter of the pipe.

Although the two modes can be coupled, the features of these waves can remain the same. For instance, the two modes with speeds close to 5000 m/s can demonstrate the property of S0 waves. As further described below, S0 can represent these waves with a speed close to 5000 m/s as a plate.

Example Operations

Figure 5:
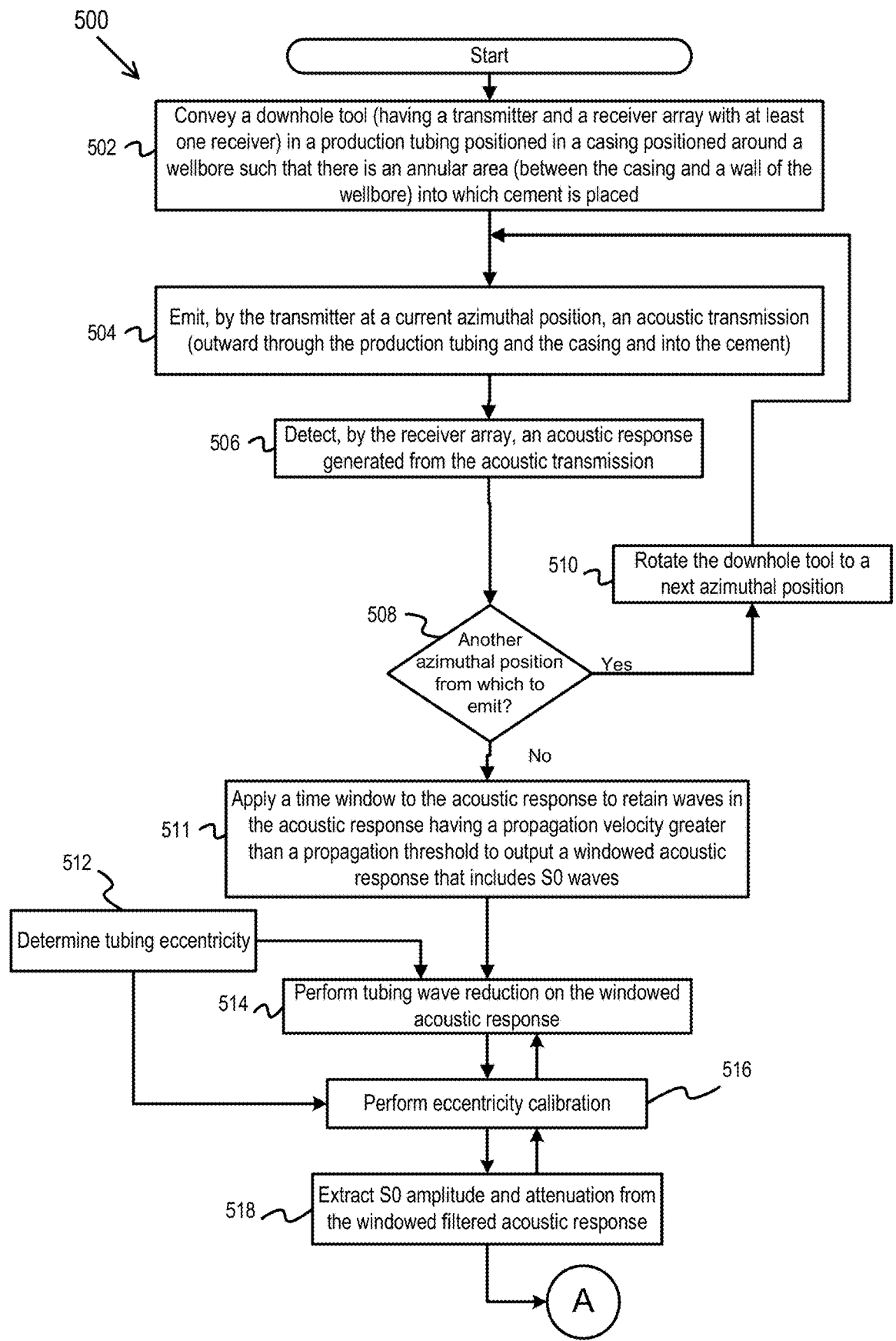
FIGS. 5-6 depict a flowchart of example operations for performing TTCE, according to some embodiments.
Figure 6:
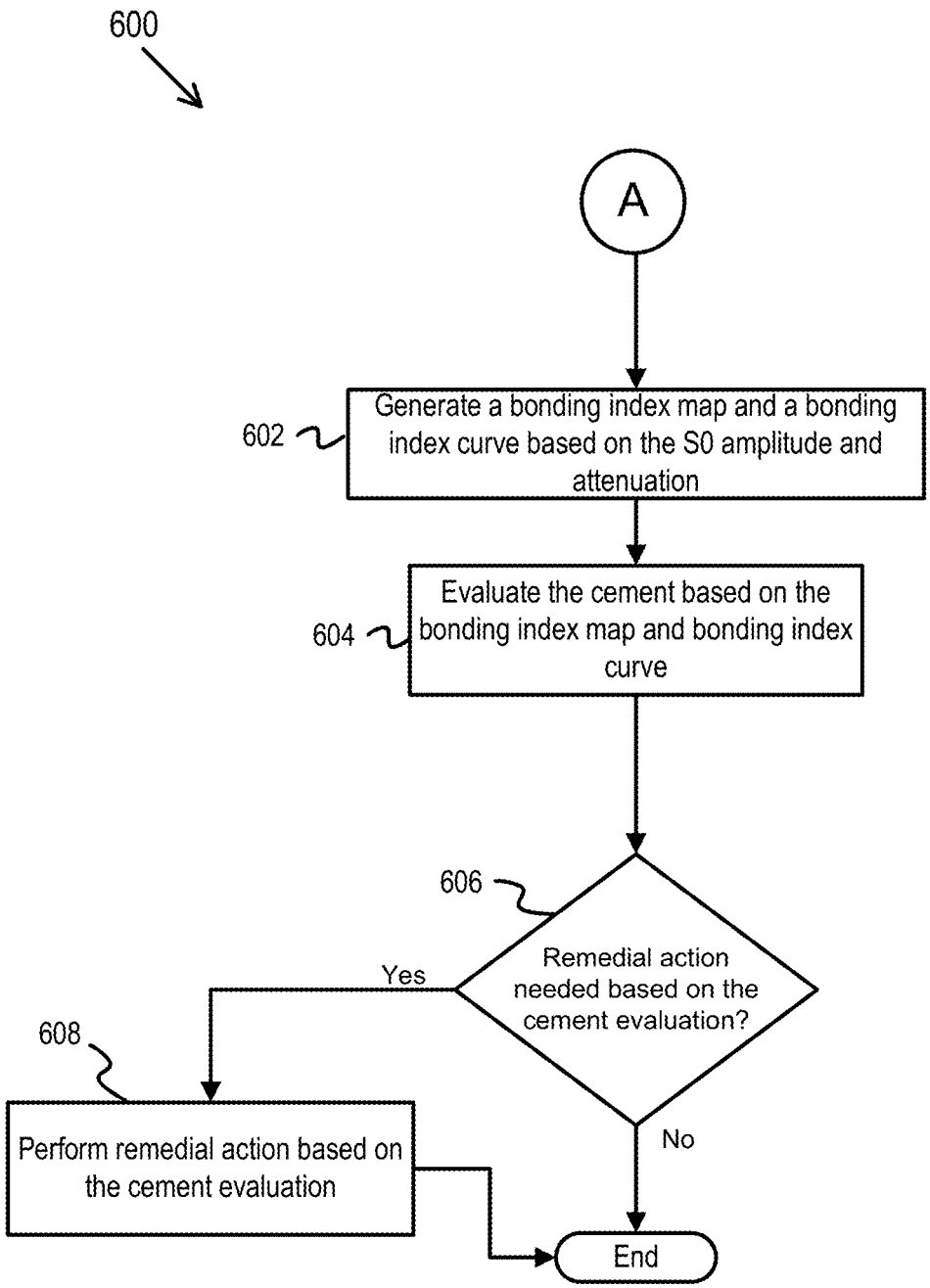

Example operations are now described. FIGS. 5-6 depict a flowchart of example operations for performing TTCE, according to some embodiments. FIGS. 5-6 depict a flowchart 500 and a flowchart 600, respectively, having operations that include a transition point A for operations to move between the flowchart 500 and the flowchart 600. Operations of the flowchart 500-600 can be performed by software, firmware, hardware or a combination thereof. Such operations are described with reference to the systems of FIGS. 1A-1B and 2-3. However, such operations can be performed by other systems or components. For example, at least some of the operations of the flowcharts 500-600 are described as being performed by a computer at a surface of the wellbore. In some embodiments, one or more of these operations can be performed by a computer at the surface and/or downhole in the wellbore. The operations of the flowchart 500 start at block 502.

At block 502, a downhole tool (having a transmitter and at least one receiver) is conveyed in a production tubing positioned in a casing positioned around a wellbore such that there is an annular area (between the casing and a wall of the wellbore) into which a cement is placed. For example, with reference to FIG. 3, the downhole tool 302 is lowered down the wellbore 301 within the production tubing 312.

At block 504, an acoustic transmission is emitted, by the transmitter at a current azimuthal position (outward through the production tubing and the casing and into the cement). For example, with reference to FIG. 3, the transmitter 306 can emit an acoustic transmission at a current azimuthal position in the wellbore 301 outward toward through the production tubing 312 and the casing 316 and into the cement 318. In some embodiments, the transmitter can be a unipole transmitter.

At block 506, an acoustic response generated from the acoustic transmission is detected by the receiver array. For example, with reference to FIG. 3, one or more of the receivers 330-338 can detect an acoustic response generated from the acoustic transmission that passes through the production tubing 312 and the casing 316 and into the cement 318. In some embodiments, the receiver(s) can be unipole receiver(s).

At block 508, a determination is made of whether there is another azimuthal position from which to emit an acoustic transmission. For example, with reference to FIG. 2, the logging controller 250 can make this determination. For instance, the TTCE operations may be configured such that emission and detection may be performed at N number of different azimuthal positions. Accordingly, the logging controller 250 can determine whether emission and detection has occurred at each of the N number of azimuthal positions. If there is another azimuthal position from which to emit an acoustic transmission, operations of the flowchart 500 continue at block 510. Otherwise, operations of the flowchart 500 continue at block 512.

At block 510, the downhole tool is rotated to a next azimuthal position. For example, with reference to FIG. 2, the logging controller 250 can control the logging tool 216 to rotate to a next azimuthal position from which to emit a next acoustic transmission. Operations of the flowchart 500 return to block 504.

Figure 7:
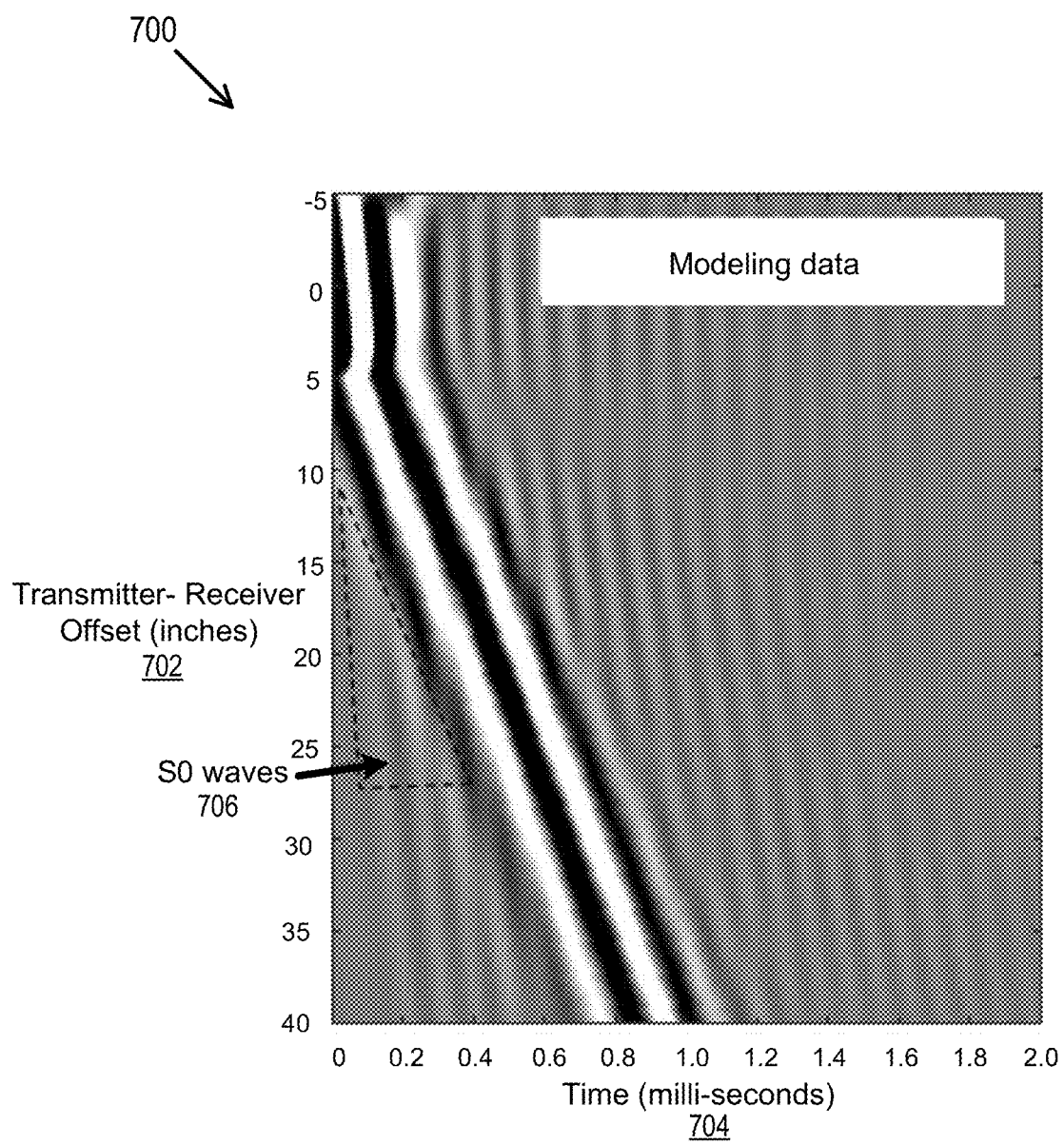
FIG. 7 depicts a graph having waveforms excited by a tilted unipole transmitter and an array of unipole receivers, according to some embodiments.

At block 511, a time window is applied to the acoustic response to retain waves in the acoustic response having a propagation velocity greater than a propagation threshold to output a windowed acoustic response that includes S0 waves. For example, with reference to FIG. 2, the TTCE processor 248 can perform this operation. In particular, since the S0 wave is the fastest guided wave in a casing or tubing, S0 waves often become the first arrivals in the full waveform train after a period of propagation. If the transmitter to receiver offset is appropriate, pure S0 waves can be obtained by applying a simple time window on the waveforms. To help illustrate, FIG. 7 depicts a graph having waveforms excited by a tilted unipole transmitter and an array of unipole receivers, according to some embodiments. In FIG. 7, a graph 700 includes a y-axis 702 that is a transmitter-receiver offset (inches) and an x-axis 704 that time (milli-seconds). The signals in a triangle 706 represent mixed casing and tubing S0 waves. Thus, it suggests that a receiver with an offset of 27 inches can capture the first two to three periods of S0 waves with limited influence from late arrivals.

At block 512, tubing eccentricity is determined. For example, with reference to FIG. 2, the TTCE processor 248 can determine the tubing eccentricity. In particular, with reference to FIG. 3, the downhole tool 302 can be centered within the production tubing 312. However, in some situations, the production tubing 312 may be off center within the casing 316. In such situations, the production tubing is considered eccentered in the casing. Consequently, in these situations, the tubing S0 waves can have the same arrival time in the azimuthal waveforms while the casing S0 waves do not have the same arrival time. In some embodiments, eccentricity of the tubing can be determined using the Third Interface Echo (TIE). The eccentricity can be defined in terms of its angle and phase. The determined tubing eccentricity can be input into operations at blocks 514 and 516.

Figure 8:
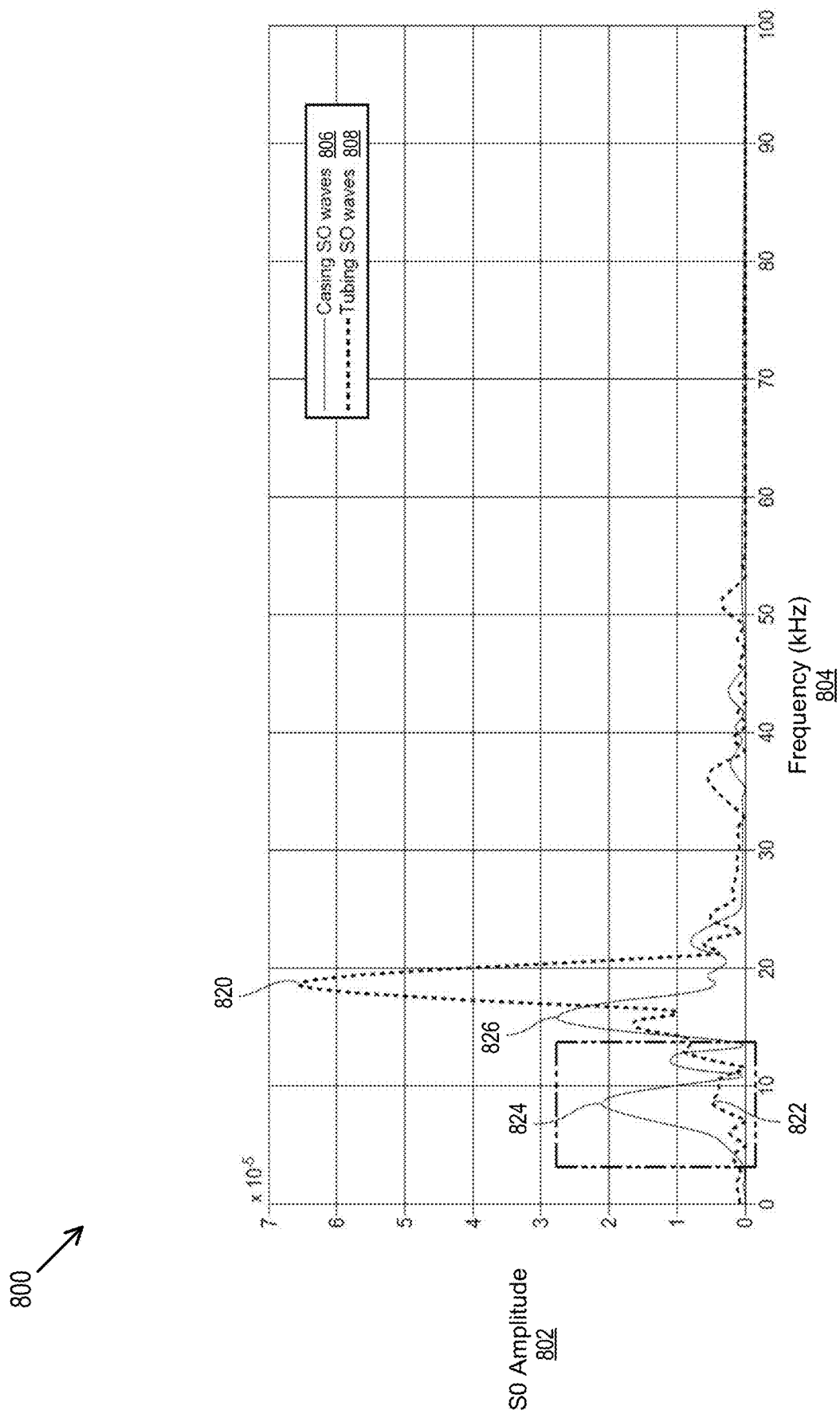
FIG. 8 depicts a graph of an example excitation spectrum of the casing S0 waves and the tubing S0 waves by a transmitter at or near the center of the wellbore, according to some embodiments.

At block 514, tubing wave reduction is performed. For example, with reference to FIG. 2, the TTCE processor 248 can perform this operation on the windowed acoustic response and based on the determined eccentricity. To illustrate this reduction, FIG. 8 depicts a graph of an example excitation spectrum of the casing S0 waves and the tubing S0 waves by a transmitter at or near the center of the wellbore, according to some embodiments. In FIG. 8, a graph 800 includes a y-axis 802 that is an amplitude of S0 waves and an x-axis 804 that is a frequency of the S0 waves (kilohertz (kHz)). Also, in the graph 800, a curve 806 represents casing S0 waves, and a curve 808 represents the tubing S0 waves. In this example, the tubing S0 waves 808 have an excitation peak at around 20 kHz (see a point 820). Also, the tubing S0 waves 808 have a stopband at or near 14 kHz (see a point 822).

The casing S0 waves 806 include two peaks (a peak 824 and a peak 826). The peak 824 is at or near 8 kHz. The peak 826 is at or near 16 kHz. As shown, the peak 824 corresponds to the stopband of tubing S0 waves (the point 822). Accordingly, the signal-to-noise ratio (SNR) can be maximized for casing S0 waves for data at or near 8 kHz. As shown in FIG. 4 (described above), the casing S0 waves and tubing S0 waves can be mixed in the time domain. Thus, additional processing can be needed to separate casing S0 waves from the tubing S0 waves. In some implementations, a spatial filter may be used to predict and remove the tubing S0 waves. The filter may be applied in at least one of the axial direction or the azimuthal direction. For instance, the downhole tool can be positioned at or near the center of the production tubing. However, the production tubing may be eccentered (not centered) in the casing. Accordingly, the tubing S0 waves can have the same arrival time in the azimuthal waveforms while the casing S0 waves may not. Therefore, a median filter can be applied to azimuthal waveforms of the acoustic response to extract the tubing S0 waves therefrom. By subtracting the tubing S0 waves from raw waves of the acoustic response, the casing S0 waves can be obtained.

Figure 9:
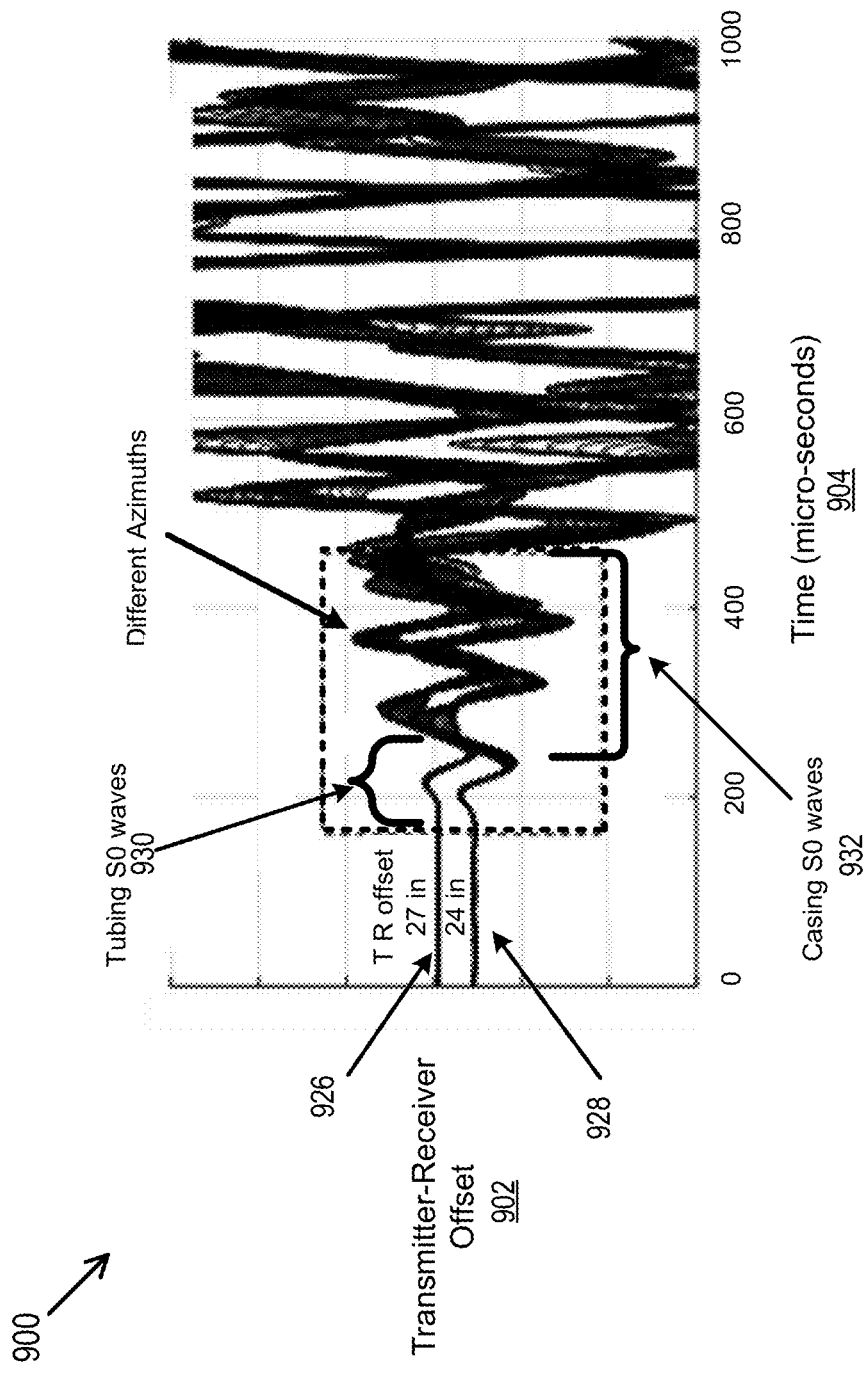
FIG. 9 depicts a graph of example measured waves by a transmitter and a receiver in a production tubing at different azimuths, according to some embodiments.

To illustrate, FIG. 9 depicts a graph of example measured waves by a transmitter and a receiver in a production tubing at different azimuths, according to some embodiments. In FIG. 9 a graph 900 includes a y-axis 902 that is a receiver number and an x-axis 904 that is time (micro-seconds). A curve 926 is the value over time when the transmitter receiver offset is 27 inches. A curve 928 is the value over time when the transmitter receiver offset is 24 inches. In this example, the production tubing is eccentric in the casing. As a result, casing S0 waves 932 are different at different azimuthal waveforms. In contrast, tubing S0 waves 930 are essentially the same.

The casing S0 waves can be obtained by taking the difference of raw waveforms and predicting tubing signals. A filter may be used to extract the tubing S0 waves. Example filters for this extraction can include median filters, spatial filters (e.g., (FK) (frequency and wave number) filters), etc. The filtering can also be performed between receivers with different transmitter-receiver offsets. A wave separation operation may be performed to identify tubing S0 waves and casing S0 waves according to the difference of their propagation factor.

Figure 10:
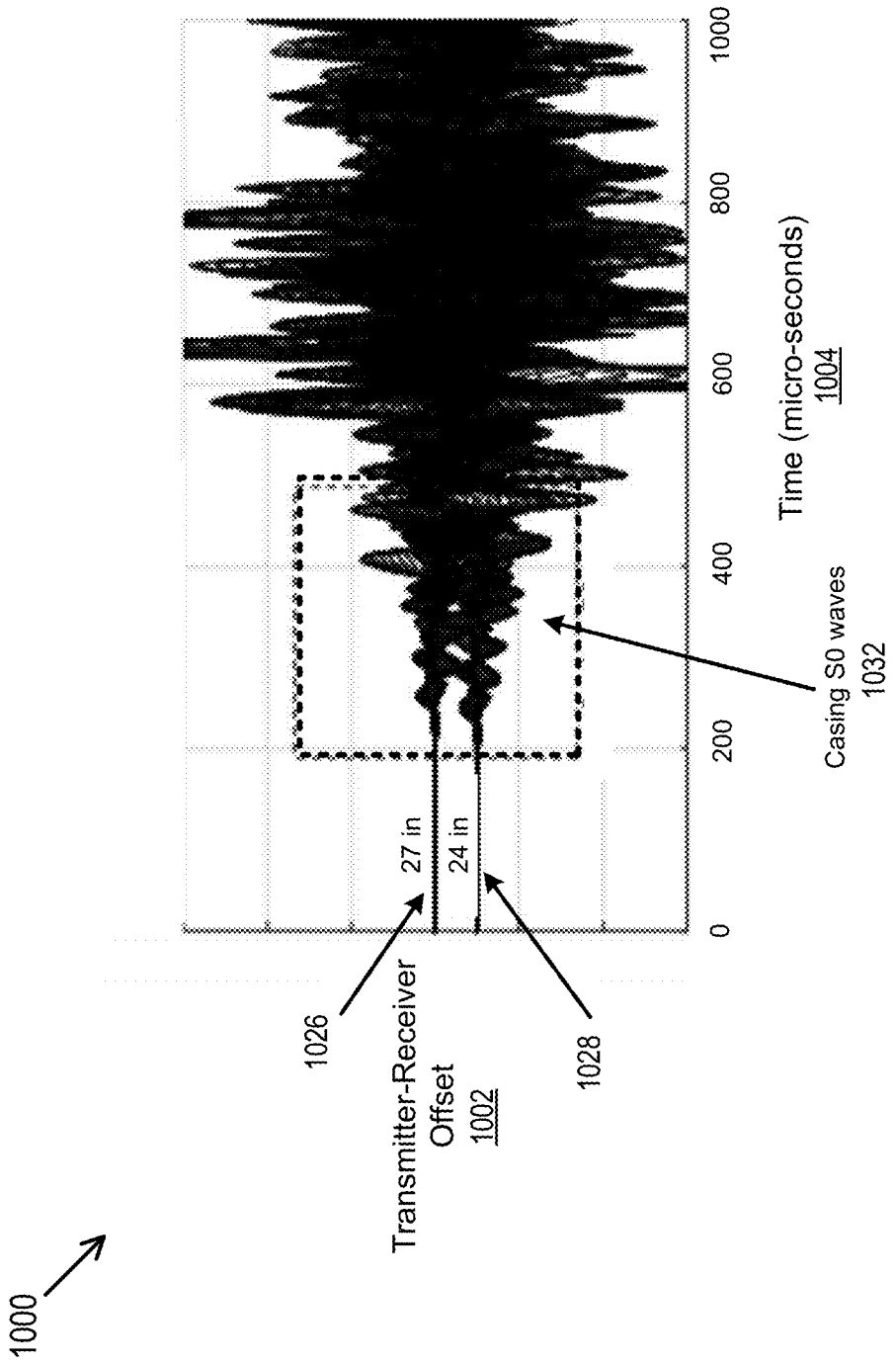
FIG. 10 depicts a graph of the example measured waves of FIG. 9 after filtering out the tubing waves-leaving casing waves, according to some embodiments.

To help illustrate, FIG. 10 depicts a graph of the example measured waves of FIG. 9 after filtering out the tubing waves-leaving casing waves, according to some embodiments. In FIG. 10, a graph 1000 includes a y-axis 1002 that is a receiver number and an x-axis 1004 that is time (micro-seconds). A curve 1026 is the value over time when the transmitter receiver offset is 27 inches. A curve 1028 is the value over time when the transmitter receiver offset is 24 inches. As shown in the graph 1000, after filtering out the tubing S0 waves, casing S0 waves 1032 remain in the waveforms.

At block 516, eccentricity calibration is performed. For example, with reference to FIG. 2, the TTCE processor 248 can perform this operation. As shown by bidirectional arrows between blocks 514 and 516 and between block 526 and 518, the eccentricity calibration can be an iteratively process to provide a more accurate value for the eccentricity for the current downhole operation. Thus, the eccentricity can be updated based on the operations at block 514 and block 518.

At block 518, S0 amplitude and attenuation are extracted from the windowed filtered acoustic response. For example, with reference to FIG. 2, the TTCE processor 248 can extract the S0 amplitude and attenuation from the windowed filtered acoustic response. For example, the S0 amplitude can be determined based on determining an instantaneous amplitude of each wave and then taking an average of these instantaneous amplitudes. The attenuation can be determined based on a difference between a response at a first receiver and a response at a second receiver (with the receivers at two different axial positions relative to the transmitter). In other words, the attenuation can be determined based on a difference in two receivers having different transmitter-receiver offsets.

Returning to the flowchart 500, operations continue at transition point A which continue at transition point A of the flowchart 500. From the transition point A of the flowchart 600, operations continue at block 602.

Figure 11:
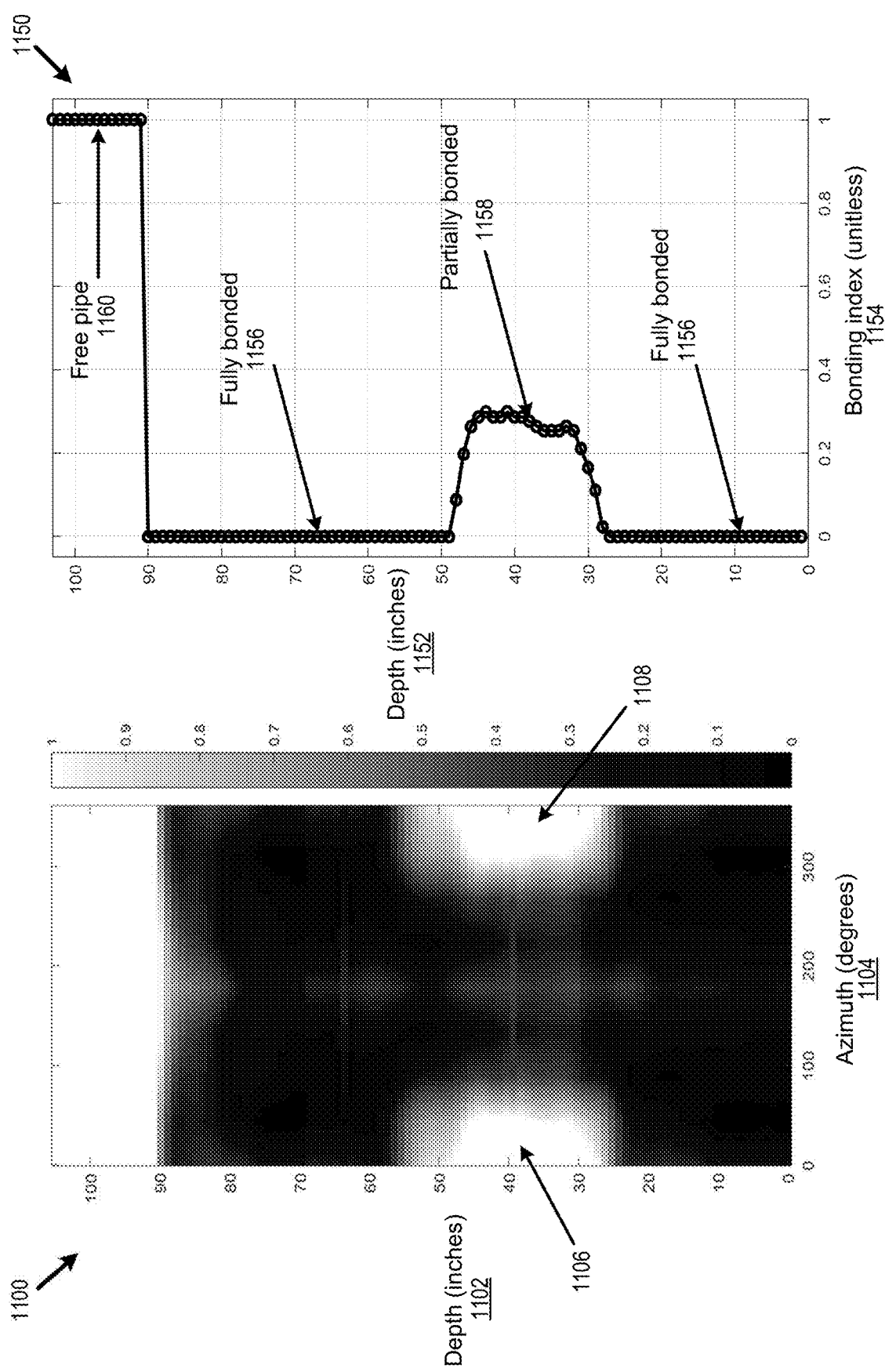
FIGS. 11A-11B depict an example bonding index map and an example bonding index curve, respectively, used for TTCE, according to some embodiments.

At block 602, a bonding index map and/or bonding index curve are generated based on the S0 amplitude and attenuation. For example, with reference to FIG. 2, the TTCE processor 248 can generate the bonding index map and/or bonding index curve. To help illustrate, FIGS. 11A-11B depict an example bonding index map and an example bonding index curve, respectively, used for TTCE, according to some embodiments. In particular, FIGS. 11A-11B depict a two-dimensional (2D) bonding index map 1100 and a one-dimensional (1D) bonding index curve 1150, respectively. The 2D bonding index map 1100 includes a y-axis 1102 that is a depth (inches) in the wellbore and an x-axis 1104 that is the azimuth (degrees) in the wellbore. As shown, the 2D bonding index map 1100 includes a channel (partially bonded) at 0 degrees—1106 and 1108. The section 1106 is the part of the channel from approximately 0) degrees to approximately 45 degrees. The section 1108 is the part of the channel from approximately 315 degrees to 360 degrees. The ID bonding index curve 1150 includes a y-axis 1152 that is a depth (inches) in the wellbore and an x-axis 1154 that is bonding index. In the ID bonding index curve 1150, a bonding index of 0) represents a fully bonded condition, and a bonding index of 1 represents a free pipe condition. Thus, the curve includes fully bonded portions 1156, a partially bonded portion 1158 (bonding index is greater than 0 but less than 1), and a free pipe portion 1160.

At block 604, evaluation of the cement based on the bonding index map and the bonding index curve is performed. For example, with reference to FIG. 2, the TTCE processor 248 can perform this cement evaluation. For instance (as described above), the value of the bonding index can enable evaluation of the cement. If the bonding index value is 0, the cement is considered fully bonded. If the bonding index value is 1, this section of the wellbore is considered free pipe with no cement. If the bonding index is greater than 0 but less than 1, the cement is considered partially bonded having fluid channels-which can be considered a fault in the cement.

At block 606, a determination is made of whether a remedial action is needed based on the cement bonding condition evaluation. For example, with reference to FIG. 2, the TTCE processor 248 can make this determination. For instance, if the cement bonding condition evaluation identifies one or more fluid channels having a size greater than a threshold, the determination can be made that a remedial action is needed to correct these faults. If a remedial action is needed, operations of the flowchart 600 continue at block 608. Otherwise, operations of the flowchart 600 are complete.

At block 608, a remedial action based on the cement bonding condition evaluation is performed. For example, with reference to FIG. 2, the TTCE processor 248 can initiate such an operation. For instance, the TTCE processor 248 could initiate an operation to provide a remedial action to correct a fault (such as the cement bonding). An example of a remedial action can include different types of remedial cementing (such as squeeze cementing). Operations of the flowchart 600 are complete.

To further illustrate the example operations of FIGS. 5-6, FIGS. 12A-12E depict example results at different stages of operations for processing the acoustic response, according to some embodiments. FIGS. 12A-12E show example processed results of S0 waves.

Figure 12:
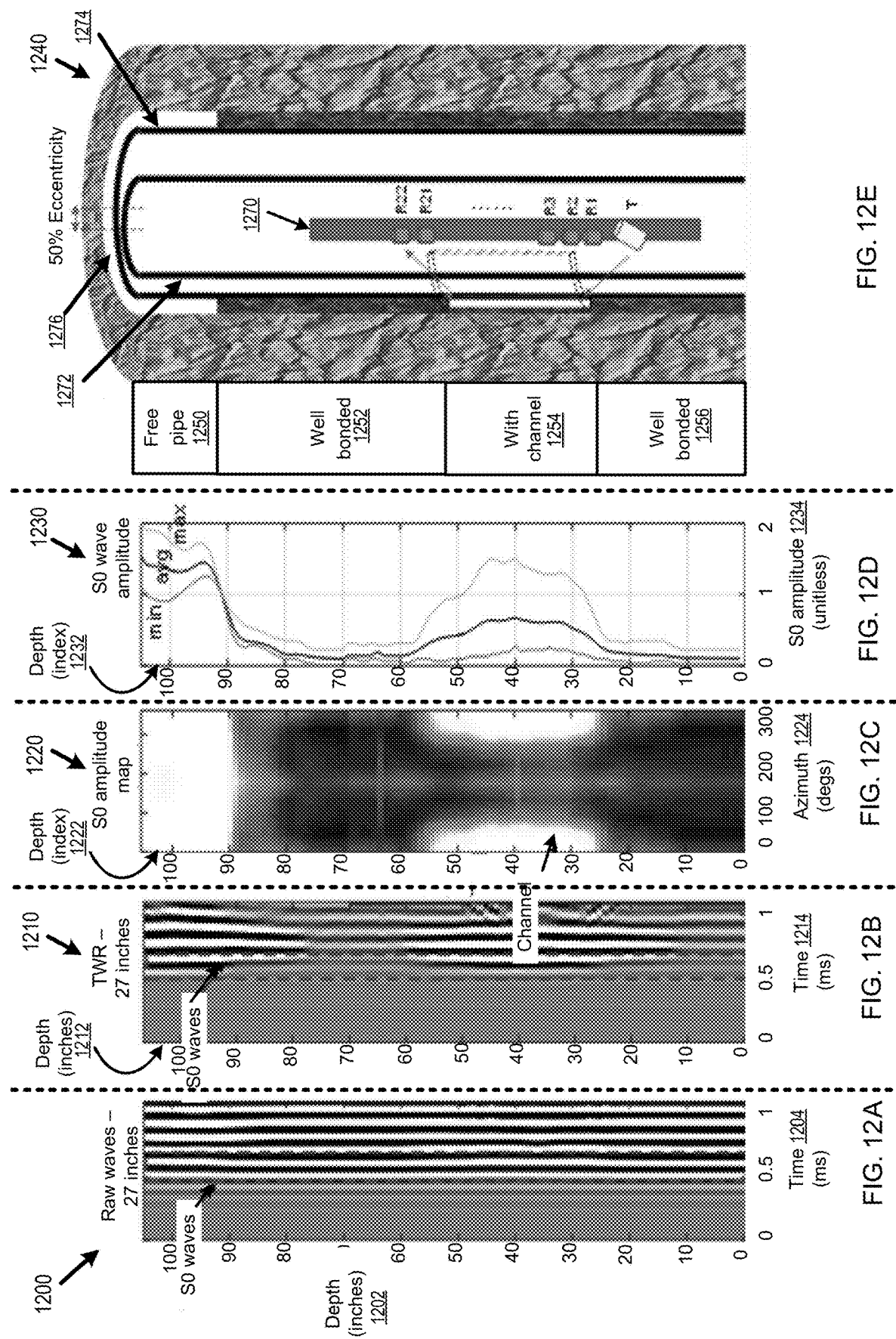
FIGS. 12A-12E depict example results at different stages of operations for processing the acoustic response, according to some embodiments.

FIG. 12A depicts a graph that includes raw waveforms having tubing waves that dominate the wave trains, according to some embodiments. In FIG. 12A, a graph 1200 includes a y-axis 1202 that is depth (inches) and an x-axis 1204 that is time (micro-seconds). With reference to FIGS. 5-6, the raw waveforms depicted in the graph 1200 can be an example acoustic response that is input to the operations at block 510.

FIG. 12B depicts a graph of an example filtered acoustic response after processing the raw waveforms of FIG. 12A after tubing wave reduction, according to some embodiments. In FIG. 12B, a graph 1210 includes a y-axis 1212 that is depth (inches) and an x-axis 1214 that is time (microseconds). With reference to FIGS. 5-6, the filtered acoustic response depicted in the graph 1210 can be an example acoustic response that is a result of the filtering by the operations at block 514.

FIGS. 12C-12D depict graphs that include an amplitude map and curves, respectively, of the casing S0 waves, according to some embodiments. In FIG. 12C, a graph 1220 includes a y-axis 1222 that is depth (index) and an x-axis 1224 that is the azimuth (degrees). In FIG. 12D, a graph 1230 includes a y-axis 1232 that is depth (index) and an x-axis 1234 that is the amplitude (unitless). In the graphs 1220-1230, a lighter shading represents unbonded zones with regard to cement bonding. The amplitude map of FIG. 12C and/or the curves of FIG. 12D can be used to generate a bonding index map. With reference to FIGS. 5-6, the graphs 1220-1230 can be example outputs of operations at block 518 and inputs for generating a bonding index map and bonding index curve at block 602.

FIG. 12E depicts a model of the downhole tool positioned in a production tubing within a casing of a wellbore, according to some embodiments. As shown in FIG. 12E, a downhole tool 1270 (with a transmitter and receiver array) is positioned in a production tubing 1272 that is within a casing 1274 in a wellbore 1276. In this example, there is a 50% eccentricity because the production tubing 1272 is offset (off center) within the casing 1274. FIG. 12E also includes different zones longitudinally located along the wellbore 1276-*a* free pipe zone 1250, a well bonded zone 1252, a zone 1254 having a channel, and a well bonded zone 1256. These different zones represent sections of the annulus between the casing 1274 and a wall of the wellbore 1276 into which cement is poured. The free pipe zone 1250 is an example of a section of the annulus in which there is no cement poured. The well bonded zones 1252 and 1256 are two different example sections of annulus in which cement is poured such the cement is essentially without defects (no channels lacking cement). The zone 1254 in which cement is poured but includes a defect (having a channel lacking cement). A three-dimensional (3D) finite-difference code is used to obtain the response waveforms as the downhole tool 1270 logs from the bottom to the top of the wellbore 1276. Additionally, the downhole tool 1270 can be rotated in the wellbore 1276 to obtain acoustic responses at different azimuthal positions.

The flowcharts are provided to aid in understanding the illustrations and are not to be used to limit scope of the claims. The flowcharts depict example operations that can vary within the scope of the claims. Additional operations may be performed; fewer operations may be performed: the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a computer or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing. The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Example Computer

Figure 13:
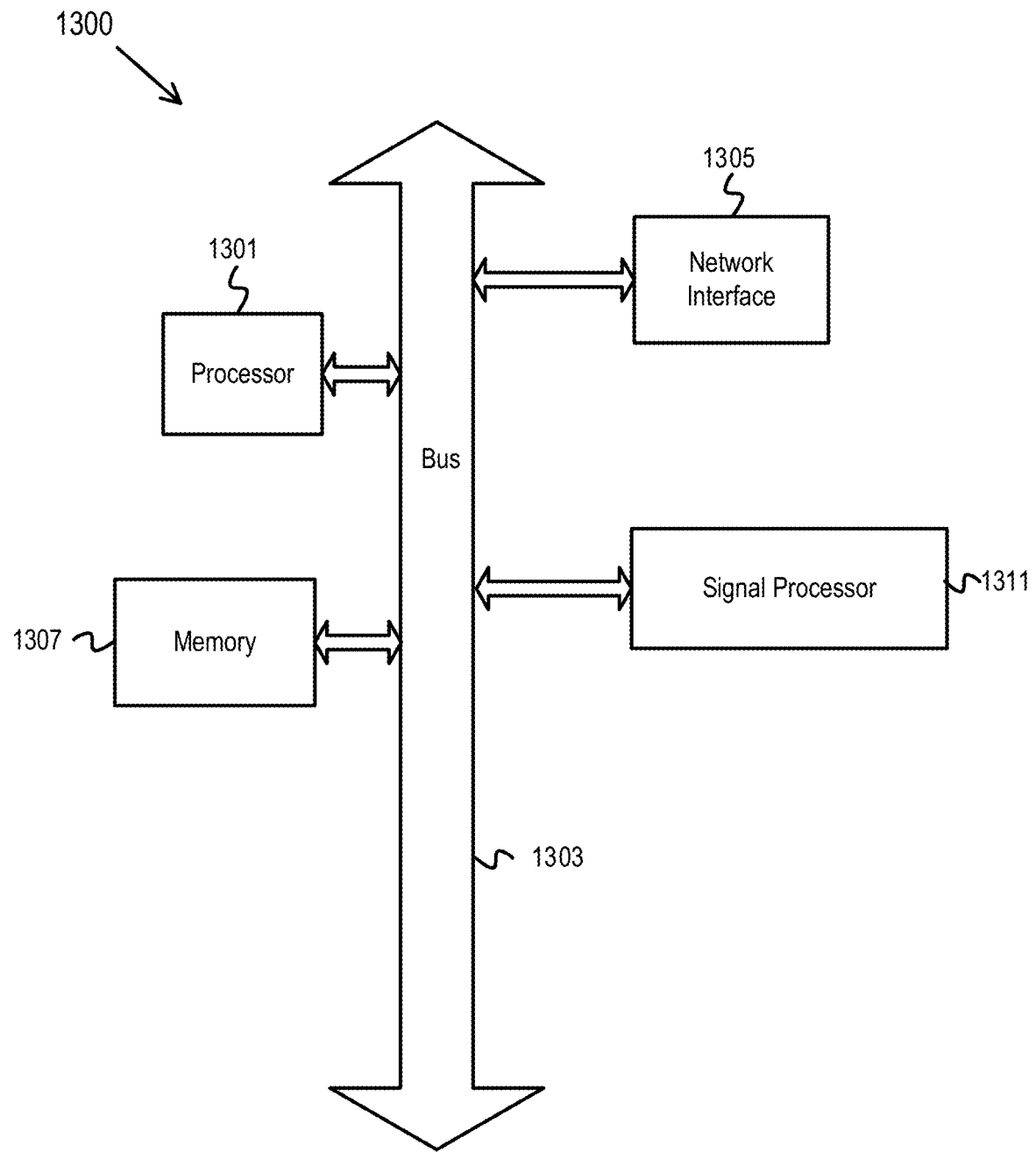
FIG. 13 depicts an example computer, according to some embodiments.

FIG. 13 depicts an example computer, according to some embodiments. A computer 1300 system includes a processor 1301 (possibly including multiple processors, multiple cores, multiple nodes, and/or implementing multi-threading, etc.). The computer 1300 includes a memory 1307. The memory 1307 may be system memory or any one or more of the above already described possible realizations of machine-readable media. The computer 1300 also includes a bus 1303 and a network interface 1305. The computer 1300 can communicate via transmissions to and/or from remote devices via the network interface 1305 in accordance with a network protocol corresponding to the type of network interface, whether wired or wireless and depending upon the carrying medium. In addition, a communication or transmission can involve other layers of a communication protocol and or communication protocol suites (e.g., transmission control protocol, Internet Protocol, user datagram protocol, virtual private network protocols, etc.).

The computer 1300 also includes a signal processor 1311 that can perform at least some of the operations described herein. Any one of the previously described functionalities may be partially (or entirely) implemented in hardware and/or on the processor 1301. For example, the functionality may be implemented with an application specific integrated circuit, in logic implemented in the processor 1301, in a co-processor on a peripheral device or card, etc. Further, realizations may include fewer or additional components not illustrated in FIG. 13 (e.g., video cards, audio cards, additional network interfaces, peripheral devices, etc.). The processor 1301 and the network interface 1305 are coupled to the bus 1303. Although illustrated as being coupled to the bus 1303, the memory 1307 may be coupled to the processor 1301.

While the aspects of the disclosure are described with reference to various implementations and exploitations, it will be understood that these aspects are illustrative and that the scope of the claims is not limited to them. In general, techniques for cement evaluation as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

EXAMPLE EMBODIMENTS

Embodiment #1: A method comprising: conveying a downhole tool in a production tubing within a casing that is around a wall of a wellbore formed in a subsurface formation, wherein cement is placed in an annulus defined between the casing and the wall of the wellbore, wherein the downhole tool includes a transmitter that comprises at least one of a unipole transmitter and a monopole transmitter, and wherein the downhole tool comprises at least one unipole receiver, wherein the transmitter and the at least one unipole receiver are mounted on a rotatable portion of the downhole tool; performing the following operations at at least two azimuthal positions based on rotation of the rotatable portion, emitting, from the transmitter, an acoustic transmission outward toward the cement; detecting, by the at least one unipole receiver, an acoustic response that is in response to the acoustic transmission propagating through the production tubing and the casing and into the cement, the acoustic response including waves that comprise casing extensional waves, casing non-extensional waves, and tubing waves; and evaluating the cement based on the casing extensional waves.

Embodiment #2: The method of Embodiment #1, further comprising: processing the acoustic response, wherein the processing comprises, applying a filter to the waves of the acoustic response to remove azimuthal waveforms from the acoustic response to output a filtered acoustic response having the casing extensional waves and casing non-extensional waves but a reduced number of the tubing waves, and wherein evaluating the cement comprises evaluating the cement based on the filtered acoustic response.

Embodiment #3: The method of Embodiment #2, wherein the processing of the acoustic response comprises: applying a time window to the filtered acoustic response to retain the waves in the filtered acoustic response having a propagation velocity that is greater than a propagation threshold to output a filtered windowed acoustic response that includes the casing extensional waves and a reduced number of the casing non-extensional waves, wherein evaluating the cement comprises evaluating the cement based on the filtered windowed acoustic response.

Embodiment #4: The method of Embodiment #3, wherein processing the acoustic response comprises: determining at least one of an amplitude and an attenuation of the casing extensional waves in the filtered windowed acoustic response, wherein evaluating the cement comprises evaluating the cement based on the at least one of the amplitude and the attenuation of the casing extensional waves in the filtered windowed acoustic response.

Embodiment #5: The method of Embodiment #4, further comprising: determining an eccentricity of the production tubing that defines an offset of a position of the production tubing from the center of the wellbore, wherein processing of the acoustic response comprises adjusting the least one of the amplitude and the attenuation of the casing extensional waves based on the eccentricity of the production tubing, wherein evaluating the cement comprises evaluating the cement based on the at least one adjusted amplitude and the adjusted attenuation of the casing extensional waves.

Embodiment #6: The method of any one of Embodiments #3-5, further comprising: generating a multi-dimensional bonding index map based on the filtered windowed acoustic response, wherein evaluating the cement comprises evaluating the cement based on the multi-dimensional bonding index map.

Embodiment #7: The method of any one of Embodiments #1-6, wherein evaluating the cement comprises evaluating a cement bonding of the cement.

Embodiment #8: The method of any one of Embodiments #1-7, further comprising: performing a downhole operation based on the evaluating of the cement.

Embodiment #9: A system comprising: a downhole tool configured to be conveyed in a production tubing within a casing that is around a wall of a wellbore formed in a subsurface formation, wherein cement is placed in an annulus defined between the casing and the wall of the wellbore, wherein the downhole tool comprises, an acoustic transmitter positioned on a rotatable portion of the downhole tool, wherein the acoustic transmitter comprises at least one of a unipole transmitter and a monopole transmitter, wherein the acoustic unipole transmitter is to emit an acoustic transmission outward toward the cement at at least two azimuthal positions based on rotation of the rotatable portion; and an acoustic unipole receiver to detect an acoustic response that is in response to the acoustic transmission propagating through the production tubing and the casing and into the cement, the acoustic response including waves that comprise casing extensional waves, casing non-extensional waves, and tubing waves: a processor; and a machine-readable medium having program code executable by the processor to cause the processor to evaluate the cement based on the casing extensional waves.

Embodiment #10: The system of Embodiment #9, wherein the program code executable by the processor to cause the processor to process the acoustic response comprises program code executable by the processor to cause the processor to apply a filter to the waves of the acoustic response to remove azimuthal waveforms from the acoustic response to output a filtered acoustic response having the casing extensional waves and casing non-extensional waves but a reduced number of the tubing waves, and wherein the program code executable by the processor to cause the processor to evaluate the cement comprises program code executable by the processor to cause the processor to evaluate the cement based on the filtered acoustic response.

Embodiment #11: The system of Embodiment #10, wherein the program code executable by the processor to cause the processor to process the acoustic response comprises program code executable by the processor to cause the processor to apply a time window to the filtered acoustic response to retain the waves in the filtered acoustic response having a propagation velocity that is greater than a propagation threshold to output a filtered windowed acoustic response that includes the casing extensional waves and a reduced number of the casing non-extensional waves, wherein the program code executable by the processor to cause the processor to evaluate the cement comprises program code executable by the processor to cause the processor to evaluate the cement based on the filtered windowed acoustic response.

Embodiment #12: The system of claim 11, wherein the program code executable by the processor to cause the processor to process the acoustic response comprises program code executable by the processor to cause the processor to determine at least one of an amplitude and an attenuation of the casing extensional waves in the filtered windowed acoustic response, wherein the program code executable by the processor to cause the processor to evaluate the cement comprises program code executable by the processor to cause the processor to evaluate the cement based on the at least one of the amplitude and the attenuation of the casing extensional waves in the filtered windowed acoustic response.

Embodiment #13: The system of Embodiment #12, wherein the program code comprises program code executable by the processor to cause the processor to determine an eccentricity of the production tubing that defines an offset of a position of the production tubing from the center of the wellbore, wherein the program code executable by the processor to cause the processor to process the acoustic response comprises program code executable by the processor to cause the processor to adjust the least one of the amplitude and the attenuation of the casing extensional waves based on the eccentricity of the production tubing, wherein the program code executable by the processor to cause the processor to evaluate the cement comprises program code executable by the processor to cause the processor to evaluate the cement based on the at least one adjusted amplitude and the adjusted attenuation of the casing extensional waves.

Embodiment #14: The system of any one of Embodiments #11-13, wherein the program code comprises program code executable by the processor to cause the processor to generate a multi-dimensional bonding index map based on the filtered windowed acoustic response, wherein the program code executable by the processor to cause the processor to evaluate the cement comprises program code executable by the processor to cause the processor to evaluate the cement based on the multi-dimensional bonding index map.

Embodiment #15: The system of any one of Embodiments #9-14, wherein the program code executable by the processor to cause the processor to evaluate the cement comprises program code executable by the processor to cause the processor to evaluate a cement bonding of the cement.

Embodiment #16: The system of any one of Embodiments #9-15, wherein the program code comprises program code executable by the processor to cause the processor to perform a downhole operation based on the evaluation of the cement.

Embodiment #17: One or more non-transitory machine-readable media comprising program code executable by a processor to cause the processor to: process an acoustic response that is in response to an acoustic transmission by a transmitter positioned in a production tubing within a casing that is around a wall of a wellbore formed in a subsurface formation, wherein cement is placed in an annulus defined between the casing and the wall of the wellbore, wherein the transmitter comprises at least one of a unipole transmitter and a monopole transmitter, wherein the acoustic transmission is emitted from the transmitter outward toward the cement, wherein the acoustic response is received by a unipole receiver positioned in the production tubing, the acoustic response including waves that comprise casing extensional waves, casing non-extensional waves, and tubing waves; and evaluate the cement based on the casing extensional waves of the processed acoustic response.

Embodiment #18: The one or more non-transitory machine-readable media of Embodiment #17, wherein the program code executable by the processor to cause the processor to process the acoustic response comprises program code executable by the processor to cause the processor to apply a filter to the waves of the acoustic response to remove azimuthal waveforms from the acoustic response to output a filtered acoustic response having the casing extensional waves and casing non-extensional waves but a reduced number of the tubing waves, and wherein the program code executable by the processor to cause the processor to evaluate the cement comprises program code executable by the processor to cause the processor to evaluate the cement based on the filtered acoustic response.

Embodiment #19: The one or more non-transitory machine-readable media of Embodiment #18, wherein the program code executable by the processor to cause the processor to process the acoustic response comprises program code executable by the processor to cause the processor to apply a time window to the filtered acoustic response to retain the waves in the filtered acoustic response having a propagation velocity that is greater than a propagation threshold to output a filtered windowed acoustic response that includes the casing extensional waves and a reduced number of the casing non-extensional waves, wherein the program code executable by the processor to cause the processor to evaluate the cement comprises program code executable by the processor to cause the processor to evaluate the cement based on the filtered windowed acoustic response.

Embodiment #20: The one or more non-transitory machine-readable media of Embodiment #19, wherein the program code executable by the processor to cause the processor to process the acoustic response comprises program code executable by the processor to cause the processor to determine at least one of an amplitude and an attenuation of the casing extensional waves in the filtered windowed acoustic response, wherein the program code executable by the processor to cause the processor to evaluate the cement comprises program code executable by the processor to cause the processor to evaluate the cement based on the at least one of the amplitude and the attenuation of the casing extensional waves in the filtered windowed acoustic response.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

What is claimed is:

1. A method comprising:
    conveying a downhole tool in a production tubing within a casing that is around a wall of a wellbore formed in a subsurface formation, wherein cement is placed in an annulus defined between the casing and the wall of the wellbore, wherein the downhole tool includes a transmitter that comprises at least one of a unipole transmitter and a monopole transmitter, and wherein the downhole tool comprises at least one unipole receiver, wherein the transmitter and the at least one unipole receiver are mounted on a rotatable portion of the downhole tool;
    performing the following operations at at least two azimuthal positions based on rotation of the rotatable portion,
        emitting, from the transmitter, an acoustic transmission outward toward the cement;
        detecting, by the at least one unipole receiver, an acoustic response that is in response to the acoustic transmission propagating through the production tubing and the casing and into the cement, the acoustic response including waves that comprise casing extensional waves, casing non-extensional waves, and tubing waves, wherein casing extensional waves are symmetric mode (S0) casing waves, casing non-extensional waves are anti-symmetric (A0) casing waves, and tubing waves are symmetric mode (S0) tubing waves;
        applying a time window to the acoustic response to retain waves in the acoustic response having a propagation velocity greater than a propagation threshold to output a windowed acoustic response that includes S0 waves;
        determining tubing eccentricity;
        performing tubing wave reduction to the time windowed acoustic response;
        performing eccentricity calibration; and
        evaluating the cement based on the casing extensional waves.

2. The method of claim 1, further comprising:
    processing the acoustic response, wherein the processing comprises,
        applying a filter to the waves of the acoustic response to remove azimuthal waveforms from the acoustic response to output a filtered acoustic response having the casing extensional waves and casing non-extensional waves but a reduced number of the tubing waves, and
    wherein evaluating the cement comprises evaluating the cement based on the filtered acoustic response.

3. The method of claim 2, wherein the processing of the acoustic response comprises:
    applying a time window to the filtered acoustic response to retain the waves in the filtered acoustic response having a propagation velocity that is greater than a propagation threshold to output a filtered windowed acoustic response that includes the casing extensional waves and a reduced number of the casing non-extensional waves,
    wherein evaluating the cement comprises evaluating the cement based on the filtered windowed acoustic response.

4. The method of claim 3, wherein processing the acoustic response comprises:
    determining at least one of an amplitude and an attenuation of the casing extensional waves in the filtered windowed acoustic response,
    wherein evaluating the cement comprises evaluating the cement based on the at least one of the amplitude and the attenuation of the casing extensional waves in the filtered windowed acoustic response.

5. The method of claim 4, further comprising:
    determining an eccentricity of the production tubing that defines an offset of a position of the production tubing from the center of the wellbore,
    wherein processing of the acoustic response comprises adjusting the least one of the amplitude and the attenuation of the casing extensional waves based on the eccentricity of the production tubing,
    wherein evaluating the cement comprises evaluating the cement based on the at least one adjusted amplitude and the adjusted attenuation of the casing extensional waves.

6. The method of claim 3, further comprising:
    generating a multi-dimensional bonding index map based on the filtered windowed acoustic response,
    wherein evaluating the cement comprises evaluating the cement based on the multi-dimensional bonding index map.

7. The method of claim 1, wherein evaluating the cement comprises evaluating a cement bonding of the cement.

8. The method of claim 1, further comprising:
    performing a downhole operation based on the evaluating of the cement.

9. A system comprising:
    a downhole tool configured to be conveyed in a production tubing within a casing that is around a wall of a wellbore formed in a subsurface formation, wherein cement is placed in an annulus defined between the casing and the wall of the wellbore,
        wherein the downhole tool comprises,
            an acoustic transmitter positioned on a rotatable portion of the downhole tool, wherein the acoustic transmitter comprises at least one of a unipole transmitter and a monopole transmitter, wherein the unipole transmitter is to emit an acoustic transmission outward toward the cement at at least two azimuthal positions based on rotation of the rotatable portion; and an acoustic unipole receiver to detect an acoustic response that is in response to the acoustic transmission propagating through the production tubing and the casing and into the cement, the acoustic response including waves that comprise casing extensional waves, casing non-extensional waves, and tubing waves, wherein casing extensional waves are symmetric mode (S0) casing waves, casing non-extensional waves are anti-symmetric (A0) casing waves, and tubing waves are symmetric mode (S0) tubing waves;

a processor, the processor configured to:
apply a time window to the acoustic response to retain waves in the acoustic response having a propagation velocity greater than a propagation threshold to output a windowed acoustic response that includes S0 waves;
determine tubing eccentricity:
perform tubing wave reduction to the time windowed acoustic response;
perform eccentricity calibration; and a machine-readable medium having program code executable by the processor to cause the processor to,
evaluate the cement based on the casing extensional waves.

10. The system of claim 9, wherein the program code executable by the processor to cause the processor to process the acoustic response comprises program code executable by the processor to cause the processor to,
apply a filter to the waves of the acoustic response to remove azimuthal waveforms from the acoustic response to output a filtered acoustic response having the casing extensional waves and casing non-extensional waves but a reduced number of the tubing waves, and
wherein the program code executable by the processor to cause the processor to evaluate the cement comprises program code executable by the processor to cause the processor to evaluate the cement based on the filtered acoustic response.

11. The system of claim 10, wherein the program code executable by the processor to cause the processor to process the acoustic response comprises program code executable by the processor to cause the processor to,
apply a time window to the filtered acoustic response to retain the waves in the filtered acoustic response having a propagation velocity that is greater than a propagation threshold to output a filtered windowed acoustic response that includes the casing extensional waves and a reduced number of the casing non-extensional waves,
wherein the program code executable by the processor to cause the processor to evaluate the cement comprises program code executable by the processor to cause the processor to evaluate the cement based on the filtered windowed acoustic response.

12. The system of claim 11, wherein the program code executable by the processor to cause the processor to process the acoustic response comprises program code executable by the processor to cause the processor to,
determine at least one of an amplitude and an attenuation of the casing extensional waves in the filtered windowed acoustic response,
wherein the program code executable by the processor to cause the processor to evaluate the cement comprises program code executable by the processor to cause the processor to evaluate the cement based on the at least one of the amplitude and the attenuation of the casing extensional waves in the filtered windowed acoustic response.

13. The system of claim 12, wherein the program code comprises program code executable by the processor to cause the processor to,
determine an eccentricity of the production tubing that defines an offset of a position of the production tubing from the center of the wellbore,
wherein the program code executable by the processor to cause the processor to process the acoustic response comprises program code executable by the processor to cause the processor to adjust the least one of the amplitude and the attenuation of the casing extensional waves based on the eccentricity of the production tubing,
wherein the program code executable by the processor to cause the processor to evaluate the cement comprises program code executable by the processor to cause the processor to evaluate the cement based on the at least one adjusted amplitude and the adjusted attenuation of the casing extensional waves.

14. The system of claim 11, wherein the program code comprises program code executable by the processor to cause the processor to,
generate a multi-dimensional bonding index map based on the filtered windowed acoustic response,
wherein the program code executable by the processor to cause the processor to evaluate the cement comprises program code executable by the processor to cause the processor to evaluate the cement based on the multi-dimensional bonding index map.

15. The system of claim 9, wherein the program code executable by the processor to cause the processor to evaluate the cement comprises program code executable by the processor to cause the processor to evaluate a cement bonding of the cement.

16. The system of claim 9, wherein the program code comprises program code executable by the processor to cause the processor to perform a downhole operation based on the evaluation of the cement.

17. One or more non-transitory machine-readable media comprising program code executable by a processor to cause the processor to:
control a transmitter that is positioned in a production tubing within a casing that is around a wall of wellbore formed in a subsurface formation, wherein cement is placed in an annulus defined between the casing and the wall of the wellbore, wherein the transmitter comprises at least one of a unipole transmitter and a monopole transmitter, wherein the program code executable by the processor to cause the processor to control the transmitter to emit an acoustic transmission in at least one of a number of different azimuthal directions;
process an acoustic response that is in response to the acoustic transmission, wherein the transmitter comprises at least one of a unipole transmitter and a monopole transmitter, wherein the acoustic transmission is emitted from the transmitter outward toward the cement, wherein the acoustic response is received by a unipole receiver positioned in the production tubing, the acoustic response including waves that comprise casing extensional waves, casing non-extensional waves, and tubing waves, wherein casing extensional waves are symmetric mode (S0) casing waves, casing non-extensional waves are anti-symmetric (A0) casing waves, and tubing waves are symmetric mode (S0) tubing waves;

apply a time window to the acoustic response to retain waves in the acoustic response having a propagation velocity greater than a propagation threshold to output a windowed acoustic response that includes S0 waves;

determine tubing eccentricity:

perform tubing wave reduction to the time windowed acoustic response;

perform eccentricity calibration; and evaluate the cement based on the casing extensional waves of the processed acoustic response.

18. The one or more non-transitory machine-readable media of claim 17, wherein the program code executable by the processor to cause the processor to process the acoustic response comprises program code executable by the processor to cause the processor to, apply a filter to the waves of the acoustic response to remove azimuthal waveforms from the acoustic response to output a filtered acoustic response having the casing extensional waves and casing non-extensional waves but a reduced number of the tubing waves, and wherein the program code executable by the processor to cause the processor to evaluate the cement comprises program code executable by the processor to cause the processor to evaluate the cement based on the filtered acoustic response.

19. The one or more non-transitory machine-readable media of claim 18, wherein the program code executable by the processor to cause the processor to process the acoustic response comprises program code executable by the processor to cause the processor to, apply a time window to the filtered acoustic response to retain the waves in the filtered acoustic response having a propagation velocity that is greater than a propagation threshold to output a filtered windowed acoustic response that includes the casing extensional waves and a reduced number of the casing non-extensional waves, wherein the program code executable by the processor to cause the processor to evaluate the cement comprises program code executable by the processor to cause the processor to evaluate the cement based on the filtered windowed acoustic response.

20. The one or more non-transitory machine-readable media of claim 19, wherein the program code executable by the processor to cause the processor to process the acoustic response comprises program code executable by the processor to cause the processor to, determine at least one of an amplitude and an attenuation of the casing extensional waves in the filtered windowed acoustic response, wherein the program code executable by the processor to cause the processor to evaluate the cement comprises program code executable by the processor to cause the processor to evaluate the cement based on the at least one of the amplitude and the attenuation of the casing extensional waves in the filtered windowed acoustic response.

\* \* \* \* \*